US012754452B2

(12) United States Patent
Miyamoto et al.

(10) Patent No.: US 12,754,452 B2
(45) Date of Patent: Oct. 6, 2026

(54) POWER SOURCE DEVICE, ELECTROPHORESIS DEVICE, POWER SOURCE DEVICE CONTROL METHOD, AND ELECTROPHORESIS DEVICE CONTROL METHOD

(71) Applicant: ARKRAY, Inc., Kyoto (JP)

(72) Inventors: Chiaki Miyamoto, Kyoto (JP); Ryota Imi, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 810 days.

(21) Appl. No.: 18/193,511

(22) Filed: Mar. 30, 2023

(65) Prior Publication Data

US 2023/0314895 A1 Oct. 5, 2023

(30) Foreign Application Priority Data

Apr. 5, 2022 (JP) ................................ 2022-063037

(51) Int. Cl.
*G02F 1/167* (2019.01)
*G02F 1/1685* (2019.01)

(52) U.S. Cl.
CPC ............ *G02F 1/1685* (2019.01); *G02F 1/167* (2013.01)

(58) Field of Classification Search
None
See application file for complete search history.

(56) References Cited

U.S. PATENT DOCUMENTS 4,224,529 A 9/1980 Fujiwara
5,180,475 A 1/1993 Young et al.
(Continued)

FOREIGN PATENT DOCUMENTS

JP S53-144398 A 12/1978
JP S60-159360 U 10/1985
(Continued)

OTHER PUBLICATIONS

P. Jelger et al., All-fiber capillary electrophoresis with novel axial in-line detection, May 2008, IEEE, 2008 Conference on Lasers and Electro-Optics and 2008 Conference on Quantum Electronics and Laser Science, DOI: 10.1109/CLEO.2008.4551213 (Year: 2008).*
(Continued)

*Primary Examiner* — Crystal L Hammond
*Assistant Examiner* — Seung Ho Choi
(74) *Attorney, Agent, or Firm* — Studebaker Brackett PLLC

(57) ABSTRACT

A power source device configured for an electrophoresis device employing a measurement tool including a capillary, the power source device including: a high voltage generation circuit configured to generate a voltage for electrophoresis; a first and a second external terminal configured to apply the electrophoresis voltage to the capillary; a polarity switching circuit including a first internal conductor connected to the high voltage generation circuit and a second internal conductor, the polarity switching circuit being configured to selectably apply a potential difference between the second and the first internal conductor across the first and the second external terminal by application with either a forward direction polarity or a reverse direction polarity; and a switching control circuit configured to control polarity switching of the polarity switching circuit to select either one of application with the forward direction polarity or application with the reverse direction polarity.

9 Claims, 12 Drawing Sheets

(56) References Cited

U.S. PATENT DOCUMENTS

| | | | |
|---|---|---|---|
| 7,357,852 | B2 | 4/2008 | Woudenberg et al. |
| 2005/0109621 | A1 | 5/2005 | Hauser et al. |
| 2012/0021451 | A1 | 1/2012 | Matsumoto et al. |

FOREIGN PATENT DOCUMENTS

| | | | | |
|---|---|---|---|---|
| JP | H11337522 | A | * | 12/1999 |
| JP | 2009-058355 | A | | 3/2009 |
| JP | 2009-265032 | A | | 11/2009 |
| JP | 2016-136135 | A | | 7/2016 |
| JP | 2019-083627 | A | | 5/2019 |
| JP | 6856495 | B2 | | 4/2021 |

OTHER PUBLICATIONS

Paweł Mateusz Nowak et al., Improving repeatability of capillary electrophoresis—a critical comparison of ten different capillary inner surfaces and three criteria of peak identification, May 2017, Anal Bioanal Chem. May 8, 2017;409(18):4383-4393. doi: 10.1007/s00216-017-0382-y (Year: 2017).*

"Notice of Reasons for Refusal" Office Action issued in JP 2022-063037; mailed by the Japanese Patent Office on Sep. 30, 2025.

The extended European search report issued by the European Patent Office on Aug. 4, 2023, which corresponds to European Patent Application No. 23165363.5-1001 and is related to U.S. Appl. No. 18/193,511.

Scott Mack et al., "A novel microchip-based imaged CIEF-MS system for comprehensive characterization and identification of biopharmaceutical charge variants", Electrophoresis, vol. 40, Nov. 8, 2019, pp. 3084-3091, Verlag Chemie, Hoboken, USA.

An Office Action, "Decision of Refusal," mailed by the Japanese Patent Office on Feb. 10, 2026, which corresponds to Japanese Patent Application No. 2022-063037 and is related to U.S. Appl. No. 18/193,511; with English language translation.

* cited by examiner

POWER SOURCE DEVICE, ELECTROPHORESIS DEVICE, POWER SOURCE DEVICE CONTROL METHOD, AND ELECTROPHORESIS DEVICE CONTROL METHOD

CROSS-REFERENCE TO RELATED APPLICATION

This application claims priority under 35 USC 119 from Japanese Patent Application No. 2022-063037, filed on Apr. 5, 2022, the disclosure of which is incorporated by reference herein.

BACKGROUND

Technical Field

The present disclosure relates to a power source device, an electrophoresis device, a power source device control method, and an electrophoresis device control method.

Related Art

Japanese Patent No. 6856495, discloses an electrophoresis device. The electrophoresis device includes a power source device, and the power source device generates a voltage to induce electrophoresis (hereafter referred to as "electrophoresis voltage"), and the electrophoresis voltage is applied to a capillary in the electrophoresis device.

The power source device of Japanese Patent No. 6856495, applies the electrophoresis voltage in a direction defined by internal connections of the power source device. There is a demand for technology in a single power source device that enables a polarity of the electrophoresis voltage (direction of voltage application) to be selected for both one direction and a reverse direction.

SUMMARY

The present disclosure provides a power source device that may enable selection of both one direction and a reverse direction in relation to a polarity of an electrophoresis voltage, and to an electrophoresis device including such a power source device, a method to control such a power source device, and a method to control such an electrophoresis device.

A first aspect of the present disclosure is a power source device configured for an electrophoresis device employing a measurement tool including a capillary, the power source device including: a high voltage generation circuit configured to generate a voltage for electrophoresis; a first external terminal and a second external terminal configured to apply the electrophoresis voltage to the capillary; a polarity switching circuit including a first internal conductor connected to the high voltage generation circuit and a second internal conductor, the polarity switching circuit being configured to selectably apply a potential difference between the second internal conductor and the first internal conductor across the first external terminal and the second external terminal by application with either a forward direction polarity or a reverse direction polarity; and a switching control circuit configured to control polarity switching of the polarity switching circuit to select either one of application with the forward direction polarity or application with the reverse direction polarity.

In a second aspect of the present disclosure, in the first aspect, the polarity switching circuit may include a forward direction switch pair of a first forward direction switch and a second forward direction switch, and a reverse direction switch pair of a first reverse direction switch and a second reverse direction switch; the first forward direction switch may be connected between the first internal conductor and the first external terminal; the second forward direction switch may be connected between the second internal conductor and the second external terminal; the first reverse direction switch may be connected between the first internal conductor and the second external terminal; the second reverse direction switch may be connected between the second internal conductor and the first external terminal; and the switching control circuit may be configured to control the polarity switching circuit so as to make either one of the forward direction switch or the reverse direction switch exclusively conductive.

In a third aspect of the present disclosure, in the second aspect, each of the first forward direction switch, the second forward direction switch, the first reverse direction switch, and the second reverse direction switch, may include an input side that receives a switching signal according to the forward direction polarity or the reverse direction polarity and an output side that operates in response to the switching signal; and the output side may be electrically insulated from the input side.

In a fourth aspect of the present disclosure, in the second aspect or the third aspect, the switching control circuit may include an interval generation circuit configured to generate a signal for switching between the forward direction switch pair and the reverse direction switch pair, so as to provide an interval of time during which both the forward direction switch pair and the reverse direction switch pair are non-conductive, in a case in which switching between one and the other of the forward direction switch pair and the reverse direction switch pair.

In a fifth aspect of the present disclosure, in any one of the first aspect to the fourth aspect, the switching control circuit may include an input that receives a polarity signal that defines the forward direction polarity or the reverse direction polarity; and the switching control circuit may include a hold circuit configured to hold a polarity state as indicated by the polarity signal.

In a sixth aspect of the present disclosure, in the fifth aspect, the polarity signal may be generated based on an operation mode designation input through an input device of the electrophoresis device.

In a seventh aspect of the present disclosure, in the fifth aspect or the sixth aspect, the power source device may further include a voltage detection circuit connected to an output of the high voltage generation circuit, the voltage detection circuit being configured to generate a detection signal indicating voltage generation or non-generation in the high voltage generation circuit; the switching control circuit may include an inhibit circuit that receives the detection signal and the polarity signal; the hold circuit may be connected to an output of the inhibit circuit; and the inhibit circuit may generate an output value that holds the polarity state of the hold circuit irrespective of the polarity signal, in a case in which the detection signal indicates that the high voltage generation circuit is performing voltage generation operation, and generates an output value corresponding to a value of the polarity signal, in a case in which the detection signal indicates that the high voltage generation circuit is not performing voltage generation operation.

In an eighth aspect of the present disclosure, in any one of the first aspect to the seventh aspect, the high voltage generation circuit may include a generation circuit configured to generate a voltage, and an amplification circuit configured to amplify the voltage generated by the generation circuit and output the electrophoresis voltage; and the amplification circuit may include a Cockcroft-Walton circuit.

In a ninth aspect of the present disclosure, in any one of the first aspect to the eighth aspect, the polarity switching circuit may further include a current detection circuit to receive a current from the capillary through the polarity switching circuit; and the current detection circuit may be connected to the second internal conductor.

A tenth aspect of the present disclosure is an electrophoresis device that employs a measurement tool including a capillary, the electrophoresis device including: a power source device configured to generate an electrophoresis voltage, wherein the power source device includes a first external terminal and a second external terminal configured to apply the electrophoresis voltage to the capillary, and is configured to selectably apply the electrophoresis voltage across the first external terminal and the second external terminal by application with either a forward direction polarity or a reverse direction polarity; and an input device configured to receive designation of an operation mode indicting either the forward direction polarity or the reverse direction polarity.

An eleventh aspect of the present disclosure is a method of controlling a power source device of an electrophoresis device employing a measurement tool including a capillary, the method including: connecting an output of a high voltage generation circuit of the power source device to either one of a first external terminal or a second external terminal of the power source device according to a selectable voltage polarity indicating either one of a forward direction polarity or a reverse direction polarity in the power source device; and operating the high voltage generation circuit after the output of the high voltage generation circuit has been connected to either one of the first external terminal or the second external terminal, and applying an electrophoresis voltage from the high voltage generation circuit to the capillary of the measurement tool set up in the electrophoresis device through the first external terminal or through the second external terminal.

A twelfth aspect of the present disclosure is a method for controlling an electrophoresis device, the method including: preparing an electrophoresis device employing a measurement tool including a capillary, wherein the electrophoresis device is an electrophoresis device prepared including a power source device and an input device; receiving, through the input device, an instruction designating a selectable voltage polarity indicating either one of one of a forward direction polarity or a reverse direction polarity in the power source device; and performing setting of the voltage polarity in the power source device according to the instruction and applying an electrophoresis voltage according to the set voltage polarity to the capillary of the measurement tool set up in the electrophoresis device.

According to the above aspects, the present disclosure may provide the power source device that enables selection of both one direction and a reverse direction in relation to a polarity of an electrophoresis voltage, and to a method to control such a power source device, an electrophoresis device including such a power source device, and a method to control such an electrophoresis device.

BRIEF DESCRIPTION OF THE DRAWINGS

Exemplary embodiments will be described in detail based on the following figures, wherein.

DETAILED DESCRIPTION

Description follows regarding an exemplary embodiment for implementing the present disclosure, with reference to the drawings.

Figure 1A:
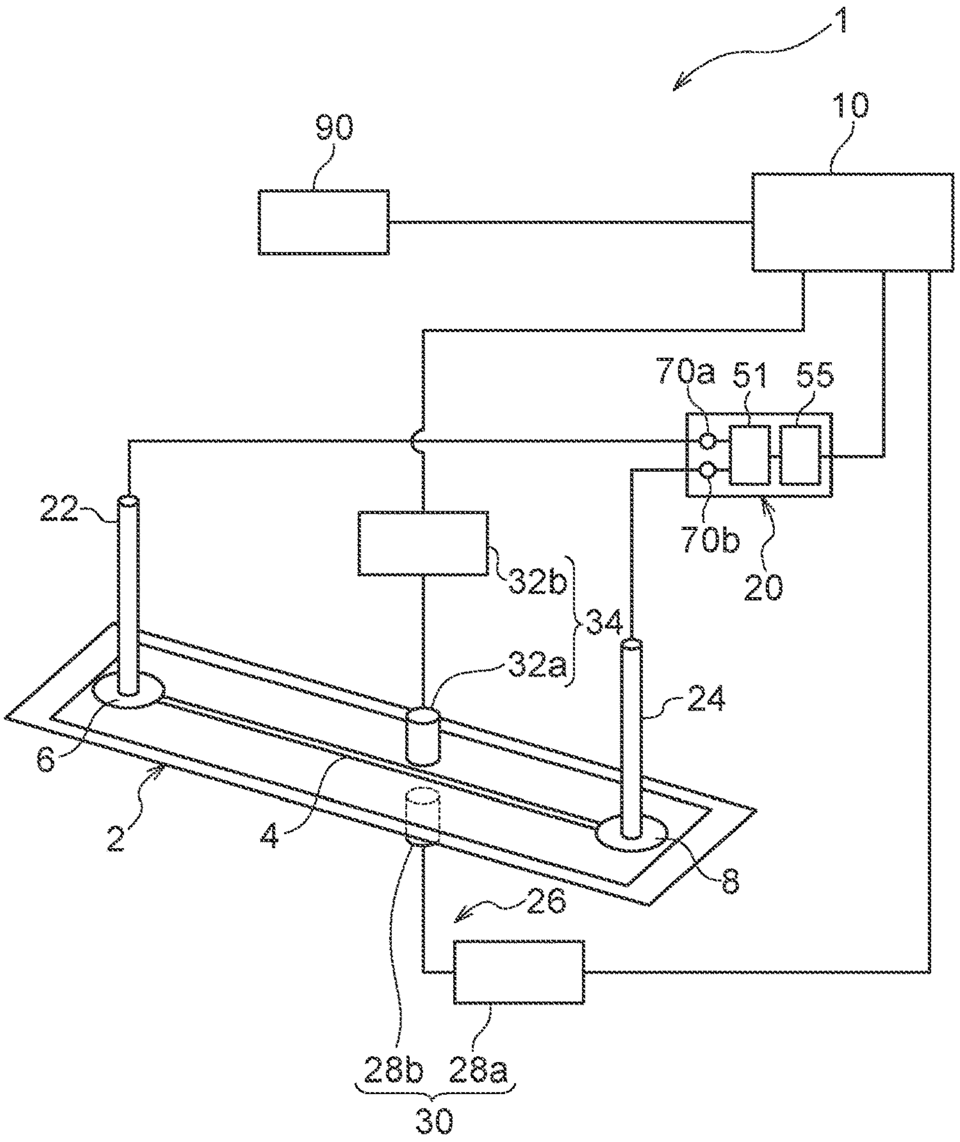
FIG. 1A is a diagram schematically illustrating an exemplary configuration of an electrophoresis device according to an exemplary embodiment.
Figure 1B:
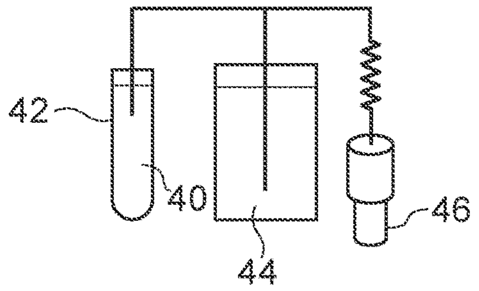
FIG. 1B is a diagram schematically illustrating an exemplary configuration of detail related to the electrophoresis device according to the present exemplary embodiment.

FIG. 1A is a diagram schematically illustrating an exemplary configuration of an electrophoresis device according to the present exemplary embodiment. FIG. 1B is a diagram schematically illustrating an exemplary configuration of detail related to the electrophoresis device according to the present exemplary embodiment.

As can be seen from FIG. 1A and FIG. 1B, an electrophoresis device 1 includes a control device 10, a power source device 20, a first electrode 22, a second electrode 24, and an analysis device 26.

The electrophoresis device 1 is an analysis device capable of implementing capillary electrophoresis, and this analysis device is capable of measuring or analyzing a sample in a measurement tool such as, for example, a sample 40 electrophoresing through a capillary 4 of a microchip 2, using capillary electrophoresis. More specifically, the sample 40 electrophoreses inside the capillary 4 of the microchip 2. An example of a measurement tool of the present disclosure is illustrated as the microchip 2. The microchip 2 includes the sample 40 containing a migration body 44 in a state in which current flows sufficiently. The sample 40 encompasses a sample 40 containing the migration body 44, or a sample 40 containing a solution of a migration solution diluted with a diluent (a solution state migration body 44). The sample 40 may be diluted in a case in which the sample 40 needs to be diluted for analysis.

The microchip 2 includes the capillary 4 serving as a flow path, an introduction reservoir 6, and a discharge reservoir 8. The sample 40 to be subjected to analysis and the migration body 44 are introduced into the introduction reservoir 6. The migration solution (the migration body 44) function as a buffer in capillary electrophoresis. An example of the migration solution (the migration body 44) is 100 mM malic acid–arginine buffer (pH 5.0)+1.5% sodium chondroitin sulfate C, and an example of the sample 40 is blood. The microchip 2 is a disposable type of chip and is, for example, intended to be discarded after analysis has been performed once or a specific number of times. The microchip 2 is, for example, formed from silica.

The capillary 4 contains a sample to induce electrophoresis in for analysis using capillary electrophoresis. In order to implement capillary electrophoresis, the capillary 4 has a tubular shape extending in one direction, and examples of dimensions thereof are given below. A cross-section of the tubular shaped profile is, for example, a circular shape having a diameter of from 25 μm to 100 μm, or is preferably a rectangular shape having sides of from m to 100 μm. Although a length of the tubular shaped profile is preferably, for example, about 30 mm, there is no limitation thereto.

The discharge reservoir 8 is positioned at the downstream side of the capillary 4 in the migration direction under capillary electrophoresis. The sample 40 and the migration body 44 that have electrophoresed through the capillary 4 and completed analysis are stored in the discharge reservoir 8. The already analyzed sample 40 and migration body 44 in the discharge reservoir 8 are, for example, discharged from the discharge reservoir 8 using a discharge nozzle (omitted in the drawings) and a suction pump (omitted in the drawings). The discharge nozzle (omitted in the drawings) is attached to the discharge reservoir 8, or the suction pump (omitted in the drawings) is employed for discharge through the discharge nozzle (omitted in the drawings).

A first external terminal 70*a* and a second external terminal 70*b* are respectively connected to the first electrode 22 and the second electrode 24. The first electrode 22 and the second electrode 24 are, for example, rod shaped electrodes made from copper (Cu) with a cross-sectional diameter of from 0.8 mm to 1.0 mm. The first electrode 22 is immersed in the introduction reservoir 6 and the second electrode 24 is immersed in the discharge reservoir 8 so as to enable a voltage to be applied to the capillary 4. In this exemplary arrangement the first electrode 22 and the second electrode 24 are able to apply a voltage to the capillary 4, the sample 40 is filled into the capillary 4 of the microchip 2 so as to be able to migrate, and the introduction reservoir 6 and the discharge reservoir 8 are positioned at one end and the other end of the capillary 4, respectively. However, the placement of the first electrode 22 and the second electrode 24 is not limited thereto.

The analysis device 26 is employed, for example, to execute light absorption measurement and, as illustrated in FIG. 1, includes a light source device 30 (a light emitting device 28*a* and an illumination device 28*b*), and a detection device 34 (a photoreceptor 32*a* and a photoelectric converter 32*b*).

The light source device 30 is configured so as to generate light of a wavelength according to the analysis target. The illumination device 28*b* is, for example, coupled to the light emitting device 28*a* through a waveguide device configured by an optical fiber, and the waveguide device shines the light from the light emitting device 28*a* on part of the capillary 4 as illumination light. The light emitting device 28*a* is configured so as to generate light employed for light absorption measurement and, for example, may include a laser device. The light emitting device 28*a* may generate light at a wavelength of 415 nm in a case in which, for example, a concentration of a hemoglobin variant of hemoglobin A1c in blood is being analyzed, however, the wavelength of the light emitting device 28*a* is not limited thereto. The detection device 34 receives light from the capillary 4 and generates an electrical signal. The photoreceptor 32*a* is connected to the photoelectric converter 32*b* through a waveguide device such as, for example, an optical fiber. The detection device 34 performs processing on the electrical signal from the photoelectric converter 32*b*.

Figure 2:
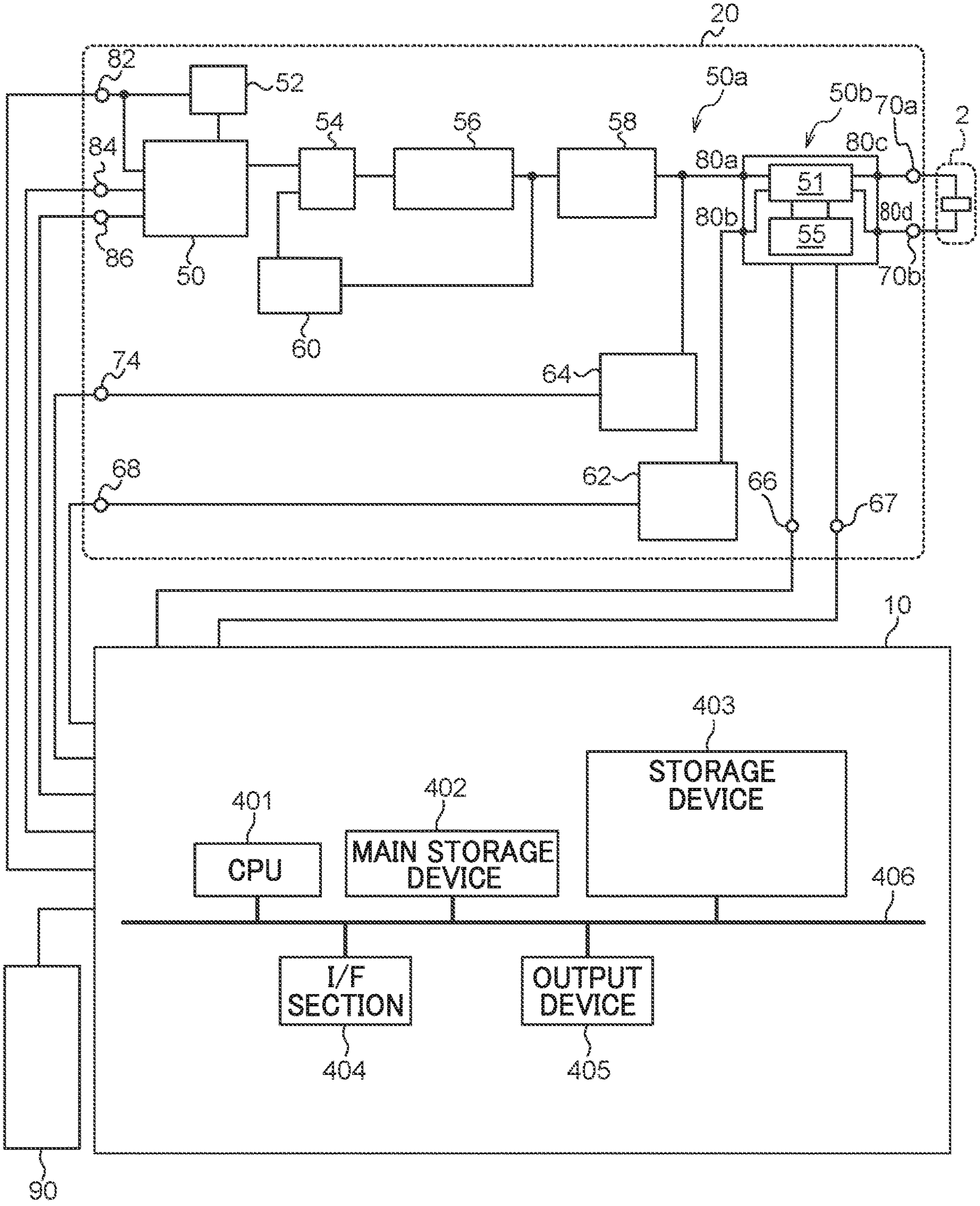
FIG. 2 is a block diagram schematically illustrating an example of a configuration of a power source device.

The control device 10 controls operation of each section of the electrophoresis device 1, and performs a cycle of control so as to implement analysis with the electrophoresis device 1. As illustrated in FIG. 2, the control device 10 includes a central processing unit (CPU) 401, a main storage device 402, a storage device 403 configured by read only memory (ROM) and random access memory (RAM), an interface 404, an output device 405, and a bus 406. The control device 10 may, for example, include a processing device configured by a microprocessor. For example, the control device 10 may include a power source port to receive voltage supply from a power source external to the device (for example, from a domestic power supply socket).

As illustrated in FIG. 1A and FIG. 1B, in a case in which measurement or analysis is performed using the electrophoresis device 1, first the migration body 44 (migration solution) is introduced through an introduction nozzle 46 into the introduction reservoir 6. This migration solution (the migration body 44) fills the introduction reservoir 6, the capillary 4, and the discharge reservoir 8. A prescribed quantity of the sample 40 (for example blood) inside a test tube 42 is introduced into the introduction nozzle 46. In a case in which the power source device 20 is employed to apply a voltage to the first electrode 22 and the second electrode 24, a specific component such as hemoglobin A1c or hemoglobin A2 starts to be separated-fractionated out according to charge thereon by electrophoresis induced by this voltage. With the passage of time for which the voltage is applied to the sample 40, for example, the specific component is clearly separated-fractionated from other components. The specific component that is separated-fractionated moves along the capillary 4 and moves toward the discharge reservoir 8. Part of the capillary 4 is positioned between the light source device 30 and the detection device 34, and so the specific component that is moving along the capillary 4 under electrophoresis passes through this part of the capillary 4.

The illumination device 28*b* illuminates the illumination light onto this part of the capillary 4, and some of this illuminated light is absorbed by the specific component. The photoreceptor 32*a* detects non-absorbed light as transmitted light. The detection device 34 receives a signal indicating an amount of light (amount transmitted) as detected by the photoelectric converter 32*b*, and detects a concentration of the specific component of the sample 40 using the principals of light absorption measurement based on an amount of light of the illumination light and an amount of light of the transmitted light.

The electrophoresis device 1 includes the power source device 20 configured so as to generate the electrophoresis voltage, and an input device 90 configured so as to receive a designation of operation mode indicating either forward direction polarity or reverse direction polarity. The power source device 20 includes the first external terminal 70*a* and the second external terminal 70*b* configured so as to apply the electrophoresis voltage to the capillary 4. The power source device 20 enables selection of application of the electrophoresis voltage across the first external terminal 70*a* and the second external terminal 70*b* with either the forward direction polarity (for example, making the potential of the first external terminal 70*a* a high positive polarity, and making the potential of the second external terminal 70*b* a low negative polarity), or with the reverse direction polarity (for example, making the potential of the first external terminal 70*a* a low negative polarity, and making the potential of the second external terminal 70*b* a high positive polarity). The electrophoresis device 1 is accordingly able to designate an operation mode that defines either the forward direction polarity or the reverse direction polarity, and to perform electrophoresis measurement in this operation mode. Namely, electrophoresis can be performed on the sample 40 as designated by one operation mode from out of voltage application in two polarity directions, these being the forward direction polarity and the reverse direction polarity. The electrophoresis device 1 is furthermore equipped with the light source device 30 provided so as to illuminate light onto the capillary 4 and with the detection device 34 optically coupled to the light source device 30.

The power source device 20 is, broadly speaking, configured to generate a voltage of several kilovolts, for example a voltage of about 1.5 kV, for generating the voltage needed for capillary electrophoresis in the electrophoresis device 1 employing the measurement tool including the capillary 4. The power source device 20 is equipped with the first external terminal 70*a* serving as an output terminal and the second external terminal 70*b* serving as an input terminal.

Figure 3:
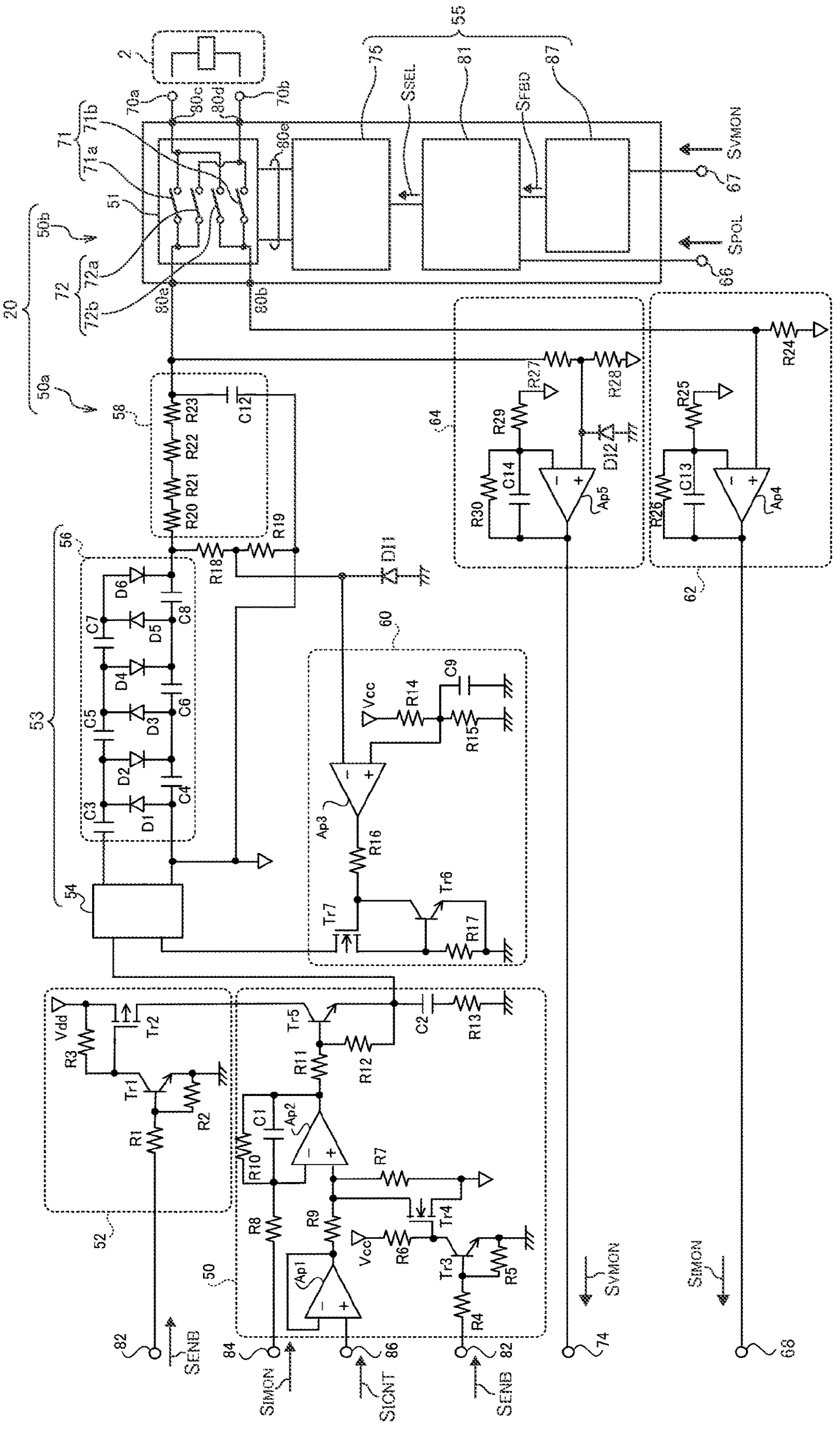
FIG. 3 is a circuit diagram illustrating an example of a configuration of a power source device.

Detailed explanation follows regarding the power source device 20. FIG. 2 is a block diagram schematically illustrating an example of a configuration of the power source device 20. FIG. 3 is a circuit diagram illustrating an example of a configuration of the power source device 20.

As illustrated in FIG. 2 and FIG. 3, the power source device 20 includes a voltage generation section 50*a* and a voltage switching section 50*b*. The voltage generation section 50*a* is connected to the voltage switching section 50*b*. The voltage switching section 50*b* includes an input electrode 66 configured so as to receive a polarity signal $S_{POL}$, and an input electrode 67 configured so as to receive a voltage monitoring signal $S_{VMON}$ from a voltage detection circuit 64.

The voltage generation section 50*a* includes a high voltage generation circuit 53 and furthermore, for example, may include an input control circuit 50, an enable circuit 52, an output protection circuit 58, an output voltage control circuit 60, a current detection circuit 62, and a voltage detection circuit 64. The high voltage generation circuit 53 is configured so as to generate a voltage for electrophoresis (hereafter referred to as "electrophoresis voltage"), and in the present exemplary embodiment may also include an inverter transformer circuit 54 serving as a generation circuit, and a Cockcroft-Walton circuit 56 (hereafter referred to as "CCW circuit") serving as an amplification circuit. In the power source device 20, the high voltage generation circuit 53 is able to take a voltage supplied from the generation circuit for generating a voltage and amplify this voltage in an amplification circuit, so as to generate a voltage for use in electrophoresis measurement.

The first external terminal 70*a* and the second external terminal 70*b* are configured so as to apply the electrophoresis voltage to the capillary 4 and are provided to the power source device 20. More specifically, the voltage switching section 50*b* is connected to the microchip 2 through the first external terminal 70*a* and the second external terminal 70*b*. The voltage generation section 50*a* of the power source device 20 includes a second output electrode 68, a third output electrode 74, a second input electrode 82, a third input electrode 84, and a fourth input electrode 86, and is connected to the control device 10 through these electrodes.

The voltage switching section 50*b* includes a polarity switching circuit 51 and a switching control circuit 55, with the polarity switching circuit 51 including a first internal conductor 80*a* (output) and a second internal conductor 80*b* (input). The first internal conductor 80*a* is connected to the high voltage generation circuit 53, and the second internal conductor 80*b* is connected to the current detection circuit 62 configured to receive current from the capillary 4 through the polarity switching circuit 51. The power source device 20 enables the current from the capillary 4 to be provided to the current detection circuit 62 for both, the forward direction polarity or the reverse direction polarity, according to the polarity switching circuit 51.

The switching control circuit 55 (the voltage switching section 50*b*) provides a switching signal to a control input 80*e* so as to perform switching of the polarity switching circuit 51. The polarity switching circuit 51 is able to select to apply a potential difference between the first internal conductor 80*a* (output) and the second internal conductor 80*b* (input) across the first external terminal 70*a* and the second external terminal 70*b*, in either the forward direction polarity or the reverse direction polarity. The switching control circuit 55 controls the polarity switching of the polarity switching circuit 51, and selects application of the electrophoresis voltage in either one of the forward direction polarity or the reverse direction polarity.

In the power source device 20, switching the polarity switching circuit 51 enables switching between supply of the electrophoresis voltage from the high voltage generation circuit 53 to the first external terminal 70*a* through the first internal conductor 80*a* (for example application with the forward direction polarity), or supply of the voltage from the high voltage generation circuit 53 to the second external terminal 70*b* through the first internal conductor 80*a* (for example application with the reverse direction polarity that is the opposite direction to the forward direction polarity). The switching control circuit 55 controls the polarity switching circuit 51 so as to select either one of application with the forward direction polarity or application with the reverse direction polarity. According to this switching, the second internal conductor 80*b* receives current from the capillary 4 either through the first external terminal 70*a* or through the second external terminal 70*b*. The first external terminal 70*a* and the second external terminal 70*b* are spaced apart from each other so as to maintain dielectric strength against the electrophoresis voltage from the high voltage generation circuit 53. The polarity switching circuit 51 includes a first external conductor 80*c* and a second external conductor 80*d* respectively connected to the first external terminal 70*a* and the second external terminal 70*b*.

As illustrated in FIG. 3, the polarity switching circuit 51 includes a forward direction switch pair 71 configured by a first forward direction switch 71*a* and a second forward direction switch 71*b*, and a reverse direction switch pair 72 configured by a first reverse direction switch 72*a* and a second reverse direction switch 72*b*. The first forward direction switch 71*a* is connected between the first internal conductor 80*a* and the first external conductor 80*c* (the first external terminal 70*a*). The second forward direction switch 71*b* is connected between the second internal conductor 80*b* and the second external conductor 80*d* (the second external terminal 70*b*). The first reverse direction switch 72*a* is connected between the first internal conductor 80*a* and the second external conductor 80*d* (the second external terminal 70*b*). The second reverse direction switch 72*b* is connected between the second internal conductor 80*b* and the first external conductor 80*c* (the first external terminal 70*a*). The switching control circuit 55 controls the polarity switching circuit 51 such that one out of the forward direction switch pair 71 or the reverse direction switch pair 72 is exclusively conductive.

In the power source device 20, one out of the forward direction switch pair 71 or the reverse direction switch pair 72 being conductive enables the polarity switching circuit 51 to exclusively switch between application with the forward direction polarity or application with the reverse direction polarity. Due to being exclusively conductive, the forward direction switch pair 71 and the reverse direction switch pair 72 can be prevented from transitionally being conductive at the same time during a transition period in a case in which switching between the forward direction switch pair 71 and the reverse direction switch pair 72.

Figure 4A:
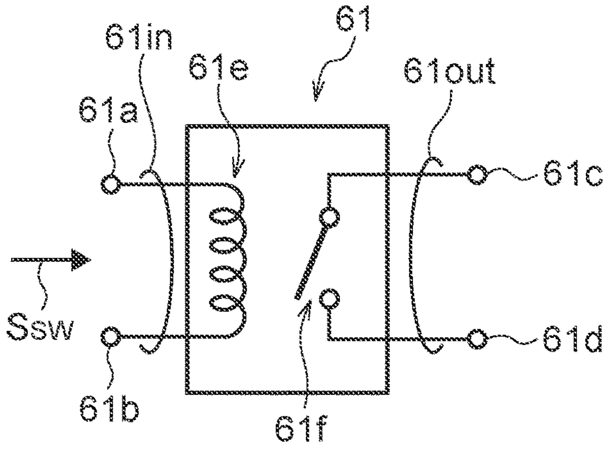
FIG. 4A is a circuit diagram illustrating an exemplary polarity switching circuit.

FIG. 4A illustrates a exemplary switch device for the polarity switching circuit 51 illustrated in FIG. 3. Note that an example of such a switch device includes a relay circuit 61, and the relay circuit 61 is able to supply the electrophoresis voltage imparted from the high voltage generation circuit 53 through the first internal conductor 80*a* to either the first external terminal 70*a* or the second external terminal 70*b*. Switching of the relay circuit may be performed by a low voltage level signal that is not the high voltage of the electrophoresis voltage from the high voltage generation circuit 53. The relay circuit 61 includes electrodes 61*a*, 61*b* for controlling a drive member 61*e* at an input side 61in in response to a switching signal $S_{SW}$, and includes electrodes 61*c*, 61*d* of an output side 61out that is either connected or disconnected by a switch body 61*f*. The input side 61in is electrically insulated from the output side 61out, and is either magnetically and/or mechanically coupled to the output side 61out.

Figure 4B:
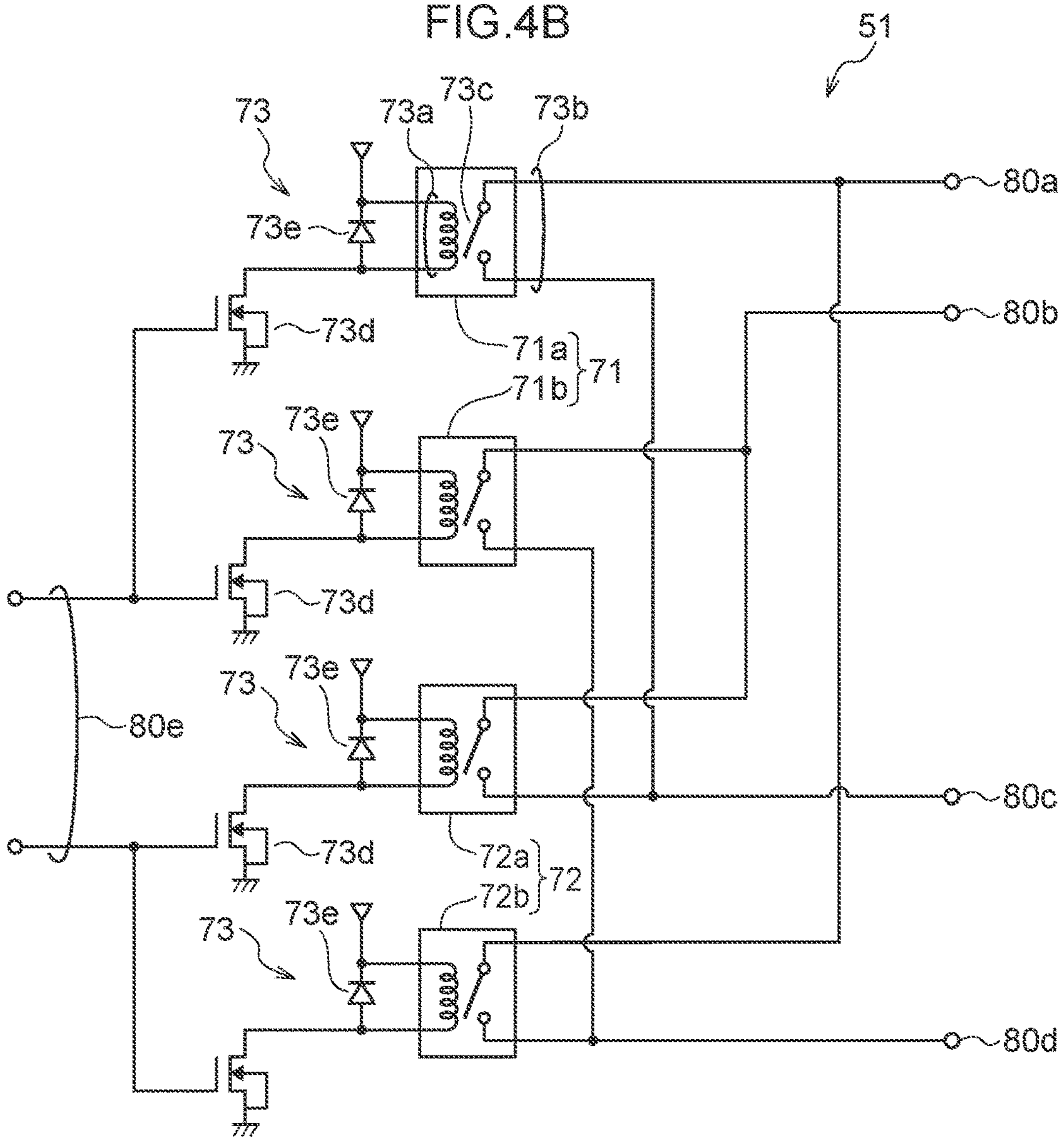
FIG. 4B is a diagram illustrating an exemplary switch device for the polarity switching circuit illustrated in FIG. 3.

FIG. 4B is an exemplary circuit diagram of the polarity switching circuit 51. In the polarity switching circuit 51 the first forward direction switch 71*a*, the second forward direction switch 71*b*, the first reverse direction switch 72*a*, and the second reverse direction switch 72*b* each include a switch device 73 as illustrated in FIG. 4A, with the switch device 73 including a switch 73*c* having an input side 73*a* and an output side 73*b*. The output side 73*b* is electrically isolated from the input side 73*a* in an open state of the switch 73*c*.

In the power source device 20, the input side 73*a* and the output side 73*b* are electrically insulated from each other in each of the first forward direction switch 71*a*, the second forward direction switch 71*b*, the first reverse direction switch 72*a*, and the second reverse direction switch 72*b*. By this insulation, the high voltage of the output side 73*b* is insulated and isolated from the input side 73*a* that receives signals having a lower voltage level than this high voltage.

The input side 73*a* receives a switching signal according to either the forward direction polarity or the reverse direction polarity, and the output side 73*b* is able to switch the switch 73*c* in response to such a switching signal. More specifically, the switch device 73 includes a drive element 73*d* (for example a transistor) to drive the input side 73*a* in response to the switching signal. A diode 73*e* is connected between the electrodes of the input side 73*a* to prevent reverse flow of the drive current. The output side 73*b* is electrically insulated from the input side 73*a*, and is also, for example, mechanically and/or magnetically coupled to the input side 73*a*.

The switch device 73 is not limited to being a relay device, and a voltage control device or a current control device may be employed therefor.

Figure 5:
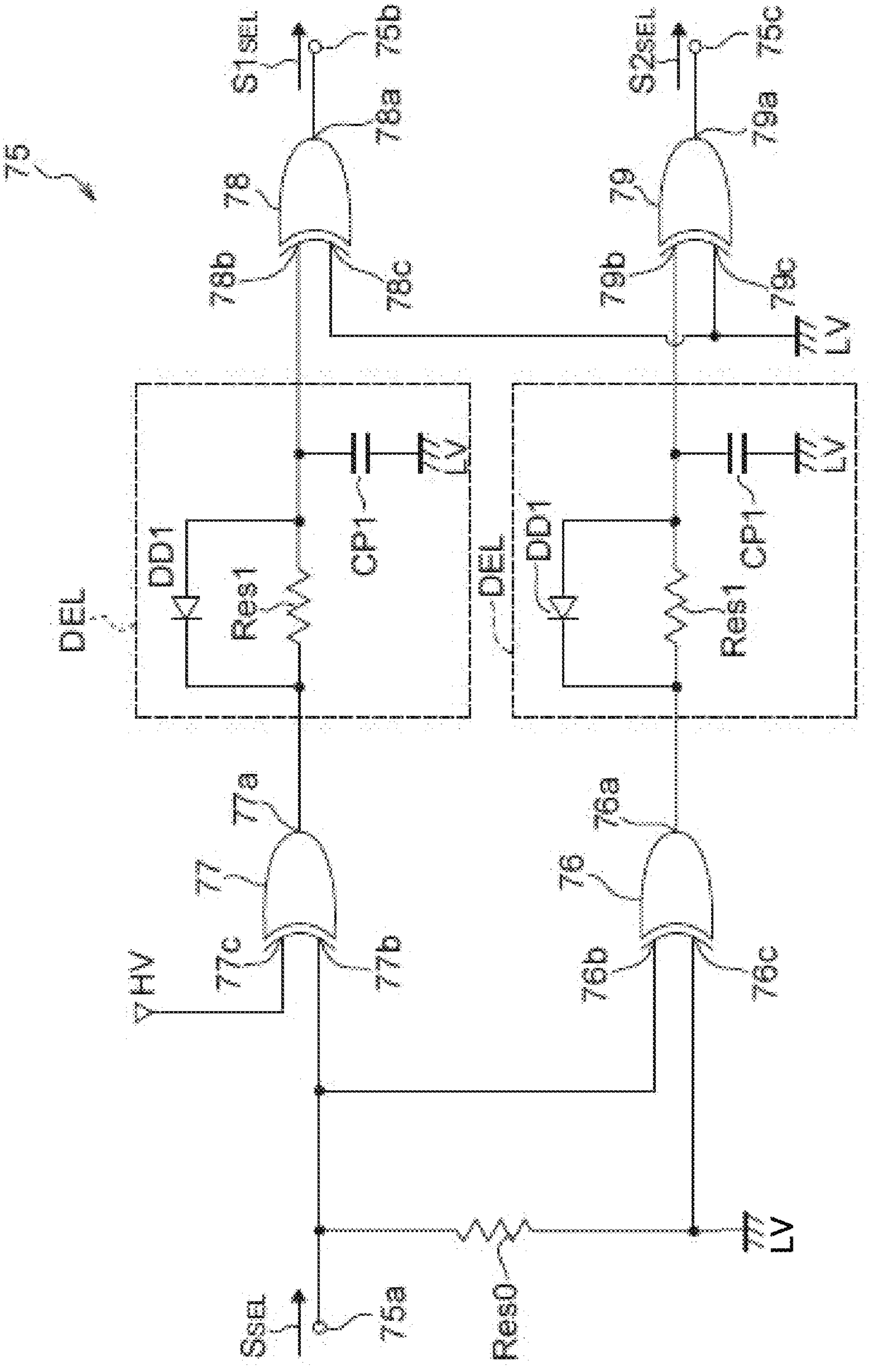
FIG. 5 is a circuit diagram illustrating an example of an interval generation circuit for the voltage switching section illustrated in FIG. 3.

FIG. 5 is a circuit diagram illustrating an example of an interval generation circuit for the voltage switching section illustrated in FIG. 4B. The switching control circuit 55 (the voltage switching section 50*b*) includes an interval generation circuit 75 so as to enable exclusive switching between forward direction polarity application and reverse direction polarity application. The interval generation circuit 75 generates a signal to switch the forward direction switch pair 71 and the reverse direction switch pair 72 so as to provide an interval of time during which both the forward direction switch pair 71 and the reverse direction switch pair 72 are nonconductive in a case in which switching between one pair and the other pair out of the forward direction switch pair 71 and the reverse direction switch pair 72.

The power source device 20 is accordingly able to perform stable switching of the polarity of the application voltage during the period in which both the forward direction switch pair 71 and the reverse direction switch pair 72 are nonconductive. The interval generation circuit 75 includes an input 75*a*, a first output 75*b*, and a second output 75*c*. The input 75*a* receives a selection signal $S_{SEL}$ to place one pair out of the forward direction switch pair 71 or the reverse direction switch pair 72 in a conducting state (closed state) and the other pair in a nonconductive state (open state). The first output 75*b* provides a switch selection signal $S1_{SEL}$ to select the forward direction switch pair 71 of the polarity switching circuit 51. The second output 75*c* provides a switch selection signal $S2_{SEL}$ to select the reverse direction switch pair 72 of the polarity switching circuit 51. The first output 75*b* and the second output 75*c* are equivalent to the control input 80*e* illustrated in FIG. 3 and FIG. 4B.

More specifically, the interval generation circuit 75 includes plural logic gates such as, for example four logic gates (in the present exemplary embodiment a first logic gate 76, a second logic gate 77, a third logic gate 78, and a fourth logic gate 79).

The first logic gate 76 receives the selection signal $S_{SEL}$ (having a logic value of "H" or "L"), and drives a selective delay circuit DEL. The second logic gate 77 receives the selection signal $S_{SEL}$ and drives the selective delay circuit DEL. An output 76*a* of the first logic gate 76 is connected to an input 79*b* of the fourth logic gate 79 through the selective delay circuit DEL. An output 77*a* of the second logic gate 77 is connected to an input 78*b* of the third logic gate 78 through the selective delay circuit DEL. The selective delay circuit DEL is able to generate a selective delay in one transition from out of two signal transitions (from H to L or from L to H), and is configured by a CR delay circuit including a resistance element Res1, a diode DD1 connected in parallel to the resistance element Res1, and a capacitor element CP1 that is connected to one end of the parallel connected resistance element Res1 and diode DD1.

In the present exemplary embodiment, the first logic gate 76 includes, for example an exclusive-OR gate, with the exclusive-OR gate being provided with an output 76*a*, an input 76*b*, and an input 76*c*. The input 76*c* is connected to the input 75*a* of the interval generation circuit 75 through a resistance element Res0. The output 76*a* is connected to the selective delay circuit DEL. The input 76*b* is connected to the input 75*a* of the interval generation circuit 75, and receives an "L" level signal both for the selection signal $S_{SEL}$ at a logic value "H" and "L". The input 76*c* is connected to a low potential power source line LV. The input 75*a* of the interval generation circuit 75 is connected to the low potential power source line LV through the resistance element Res0.

The second logic gate 77 includes, for example, an exclusive-OR gate, and this exclusive-OR gate is provided with an output 77*a*, an input 77*b*, and an input 77*c*. The output 77*a* is connected to the selective delay circuit DEL. The input 77*b* is connected (directly connected) to the input 75*a* of the interval generation circuit 75. The input 77*c* is connected to a high potential power source line HV.

The third logic gate 78 includes, for example, an exclusive-OR gate having an output 78*a*, an input 78*b*, and an input 78*c*. The output 78*a* is connected to the first output 75*b* of the interval generation circuit 75. The input 78*b* is connected to the output 77*a* of the second logic gate 77 through the selective delay circuit DEL, and receives a selective delay signal from the output 77*a*. The input 78*c* is connected to the low potential power source line LV.

The fourth logic gate 79 includes, for example, an exclusive-OR gate having an output 79*a*, an input 79*b*, and an input 79*c*. The output 79*a* is connected to the second output 75*c* of the interval generation circuit 75. The input 79*b* is connected to the output 76*a* of the first logic gate 76 through the selective delay circuit DEL, and receives a selective delay signal from the output 76*a*. The input 79*c* is connected to the low potential power source line LV.

Figure 6:
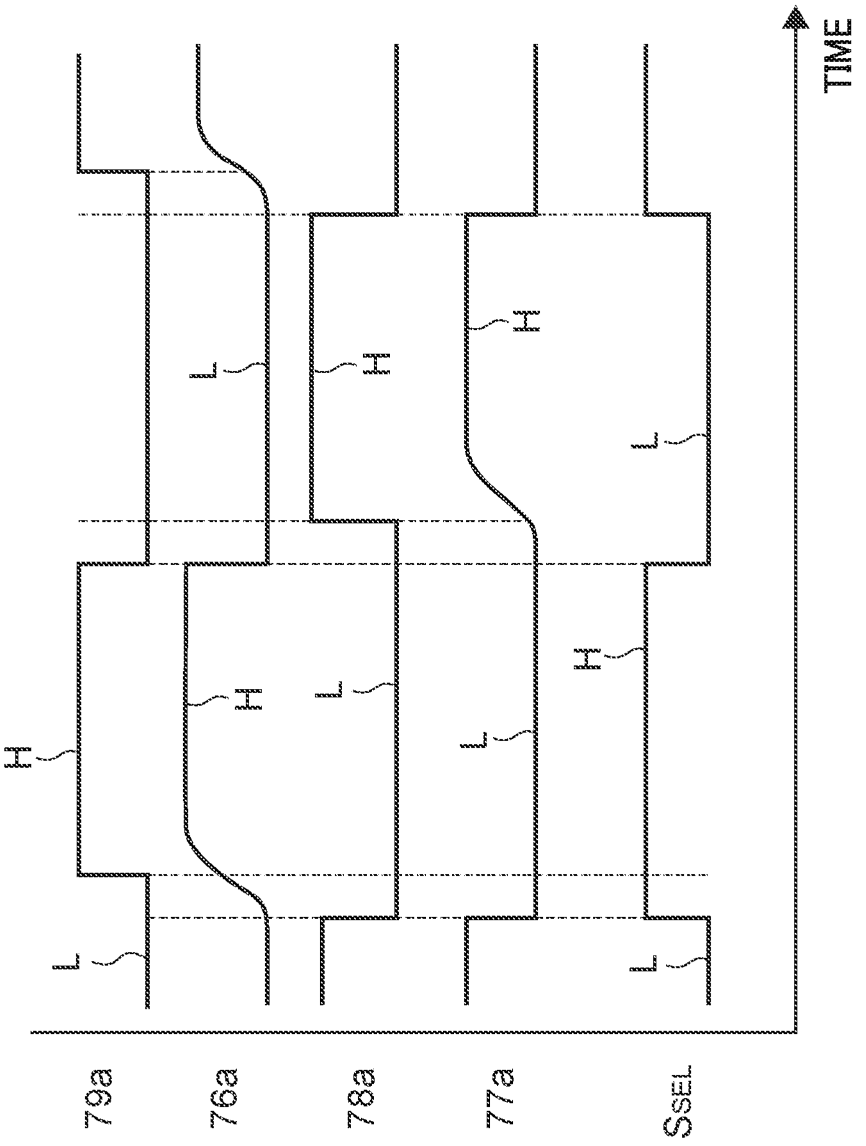
FIG. 6 is a diagram illustrating operation waveforms of the interval generation circuit illustrated in FIG. 5.

FIG. 6 is a graph illustrating operation waveforms of the interval generation circuit illustrated in FIG. 5. The output signal of the first logic gate 76 (output 76*a*) is delayed at the rising transition (from L to H) edge of the selection signal $S_{SEL}$. The output signal of the second logic gate 77 (output 77*a*) is delayed at the falling transition (from H to L) edge of the selection signal $S_{SEL}$. In a case in which the third logic gate 78 has a value "H" of the switch selection signal $S1_{SEL}$ at the output 78*a*, the interval generation circuit 75 generates a signal to make the forward direction switch pair 71 conductive. In a case in which the fourth logic gate 79 has a value "H" of the switch selection signal $S2_{SEL}$ at the output 79*a*, the interval generation circuit 75 generates a signal to make the reverse direction switch pair 72 conductive.

Figure 7:
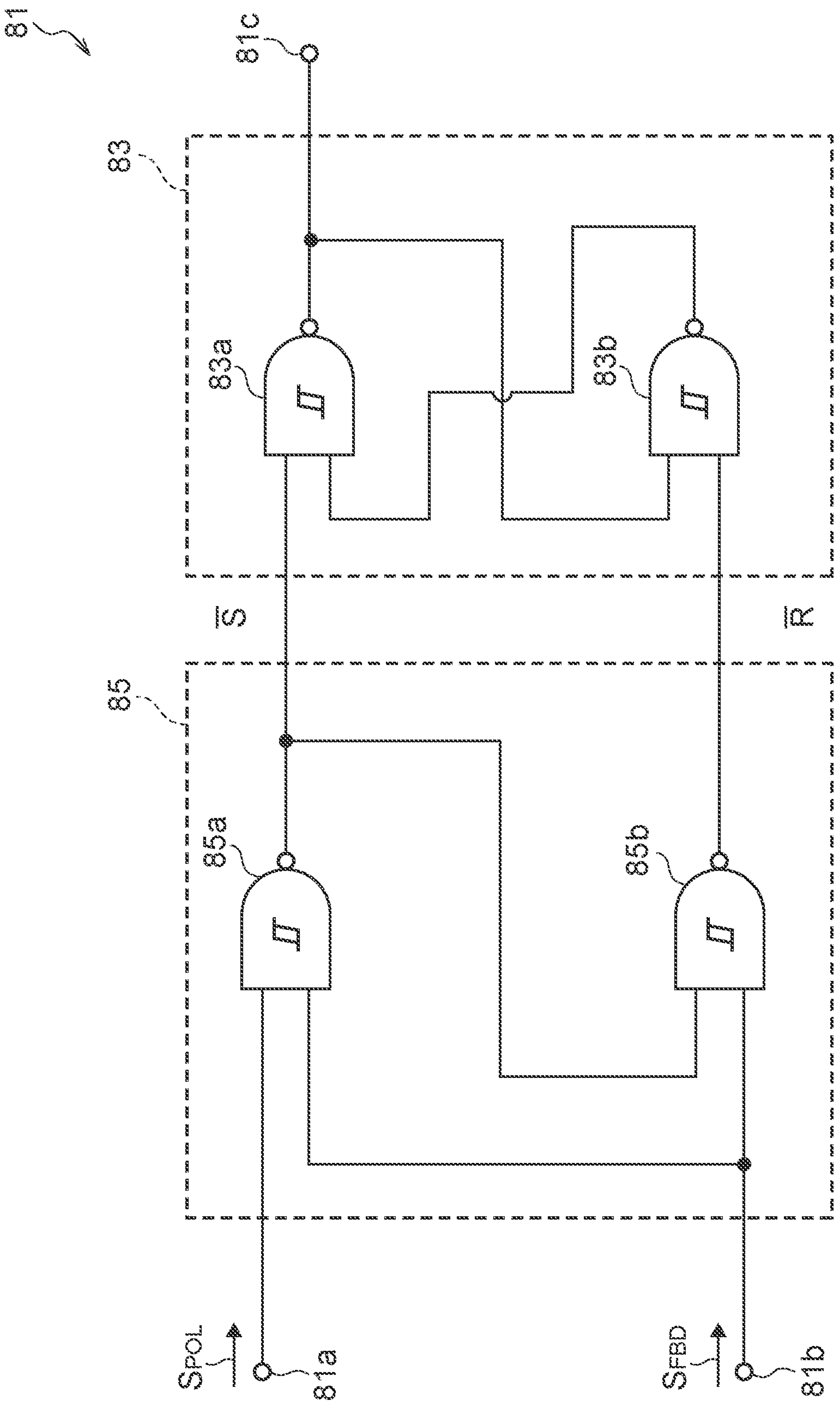
FIG. 7 is a circuit diagram to explain an example of a switching control circuit.

FIG. 7 is a circuit diagram to explain an example of a switching control circuit. The switching control circuit 55 (the voltage switching section 50*b*) may include a mode control circuit 81. The mode control circuit 81 includes an input 81*a*, an input 81*b* and an output 81*c*. The input 81*a* receives a polarity signal $S_{POL}$ defining either the forward direction polarity or the reverse direction polarity. The input 81*b* receives a forbid signal $S_{FBD}$ indicating high voltage generation or non-generation in the high voltage generation circuit 53. The output 81*c* provides the selection signal $S_{SEL}$ to the interval generation circuit 75. The mode control circuit 81 forbids change of the selection signal $S_{SEL}$ according to transition of the polarity signal $S_{POL}$ during operation (during high voltage generation) of the high voltage generation circuit 53, and enables the selection signal $S_{SEL}$ to be changed according to transition of the polarity signal $S_{POL}$ while the high voltage generation circuit 53 is stopped.

More specifically, the mode control circuit 81 includes a hold circuit 83 and an inhibit circuit 85. The hold circuit 83 holds the polarity state indicated by the polarity signal $S_{POL}$. The inhibit circuit 85 inhibits the hold circuit 83 from being changed according to transition of the polarity signal $S_{POL}$ during operation of the high voltage generation circuit 53. The inhibit circuit 85 allows the hold circuit 83 to be changed according to transition of the polarity signal $S_{POL}$ while the high voltage generation circuit 53 is stopped. While the high voltage generation circuit 53 is stopped, the inhibit circuit 85 operates as a set-reset circuit to generate a signal that causes a set-reset operation to occur in the hold circuit 83 to change the polarity state of the hold circuit 83 according to change in the polarity signal $S_{POL}$.

In the present exemplary embodiment, the hold circuit 83 includes an RS latch circuit of two inputs and two outputs. The latch circuit includes two NAND gates 83*a*, 83*b* and changes holding content according to negate set signal and negate reset signal.

The inhibit circuit 85 includes two logic gates such as, for example a first NAND gate 85*a* and a second NAND gate 85*b*. The first NAND gate 85*a* has at least two inputs, and more specifically has a first input to receive the polarity signal $S_{POL}$ and a second input to receive the forbid signal $S_{FBD}$ that forbids mode transition. The second NAND gate 85*b* has at least two inputs, and more specifically has a first input to receive the forbid signal $S_{FBD}$ that forbids mode transition and a second input to receive a signal output from the first NAND gate 85*a*. The outputs of the first NAND gate 85*a* and the second NAND gate 85*b* are connected to respective inputs of the RS latch circuit.

In the power source device 20, the inhibit circuit 85 enables a reduction in the possibility of unintentional change to the polarity state of the hold circuit 83. Each of the NAND gates 83*a*, 83*b* may have hysteresis characteristics for each individual input. Each of the NAND gates 85*a*, 85*b* may also have hysteresis characteristics for each individual input.

The polarity signal $S_{POL}$ is generated based on an operation mode designation, input through the input device 90 of the electrophoresis device 1 (see FIG. 1 and FIG. 2). The power source device 20 enables the designated forward direction polarity or reverse direction polarity to be set as the operation mode of the electrophoresis device 1. The input device 90 may, for example, include a mechanical switch, a button switch, a keyboard, a mouse, an input pen, a voice input device, a touch input device, or an I/F or the like connected over a network, however, there is no limitation thereto.

Figure 8:
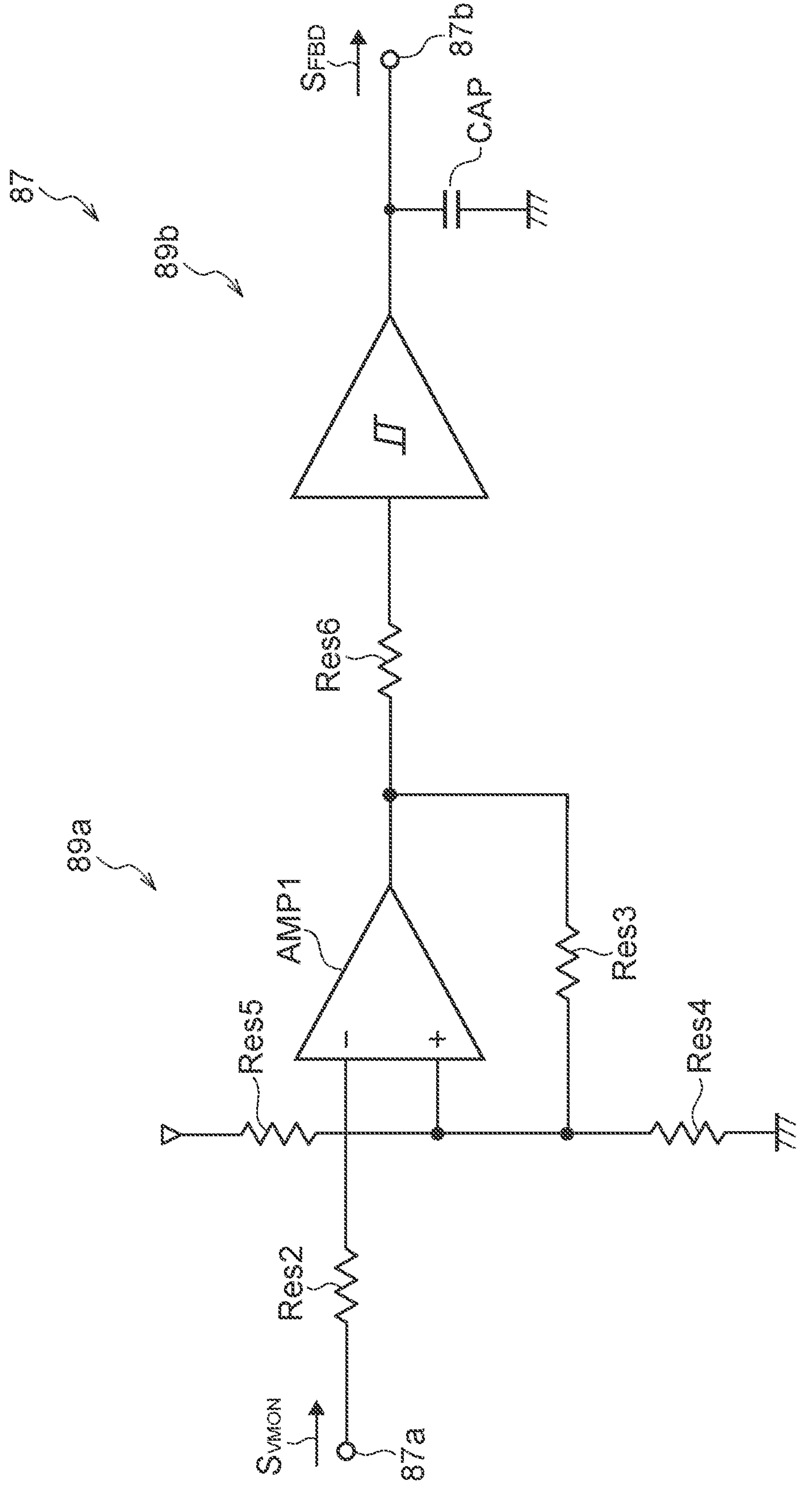
FIG. 8 is a circuit diagram illustrating a forbid signal generation circuit for generating a forbid signal.

FIG. 8 is a circuit diagram illustrating a forbid signal generation circuit for generating a forbid signal. The voltage switching section 50*b* may include a forbid signal generation circuit 87. The forbid signal generation circuit 87 includes an input 87*a* and an output 87*b*. The input 87*a* receives a voltage monitoring signal $S_{VMON}$ from the voltage detection circuit 64 through the control device 10. The output 87*b* provides a forbid signal $S_{FBD}$ to the input 81*a* of the mode control circuit 81. In the present exemplary embodiment the forbid signal generation circuit 87 includes a hysteresis comparator 89*a* and a Schmitt logic gate 89*b*. The hysteresis comparator 89*a* and the Schmitt logic gate 89*b* both include hysteresis characteristics, and are able to withstand high noise related to the generation or non-generation of the electrophoresis voltage.

The hysteresis comparator 89*a* includes an operational amplifier AMP1, and resistance elements Res2, Res3, Res4, Res5, Res6. The resistance element Res2 is connected between the input 87*a* and an inverting input of the operational amplifier AMP1. The resistance element Res3 is connected between the non-inverting input and the output of the operational amplifier AMP1. The resistance element Res4 is connected between the non-inverting input of the operational amplifier AMP1 and a low potential power source line (ground). The resistance element Res5 is connected between the non-inverting input of the operational amplifier AMP1 and a high potential power source line. The resistance element Res6 is connected between the output of the operational amplifier AMP1 and an input of a Schmitt logic gate 89*b*. The output of the Schmitt logic gate 89*b* is connected to the output 87*b* and a capacitor element CAP.

Providing the hysteresis comparator 89*a* at an initial stage of the forbid signal generation circuit 87 can prevent oscillation of output. The Schmitt logic gate 89*b* is provided at a later stage of the forbid signal generation circuit 87.

Figure 9A:
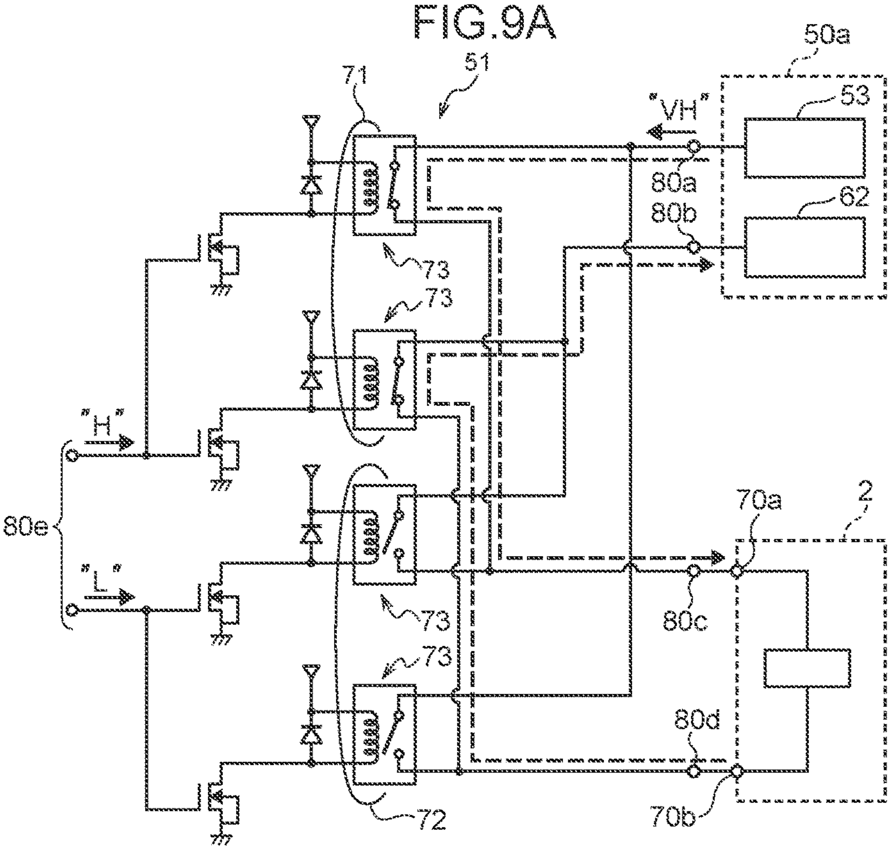
FIG. 9A is a diagram illustrating connections between a voltage generation section and a measurement tool under a respective polarity signal.
Figure 9B:
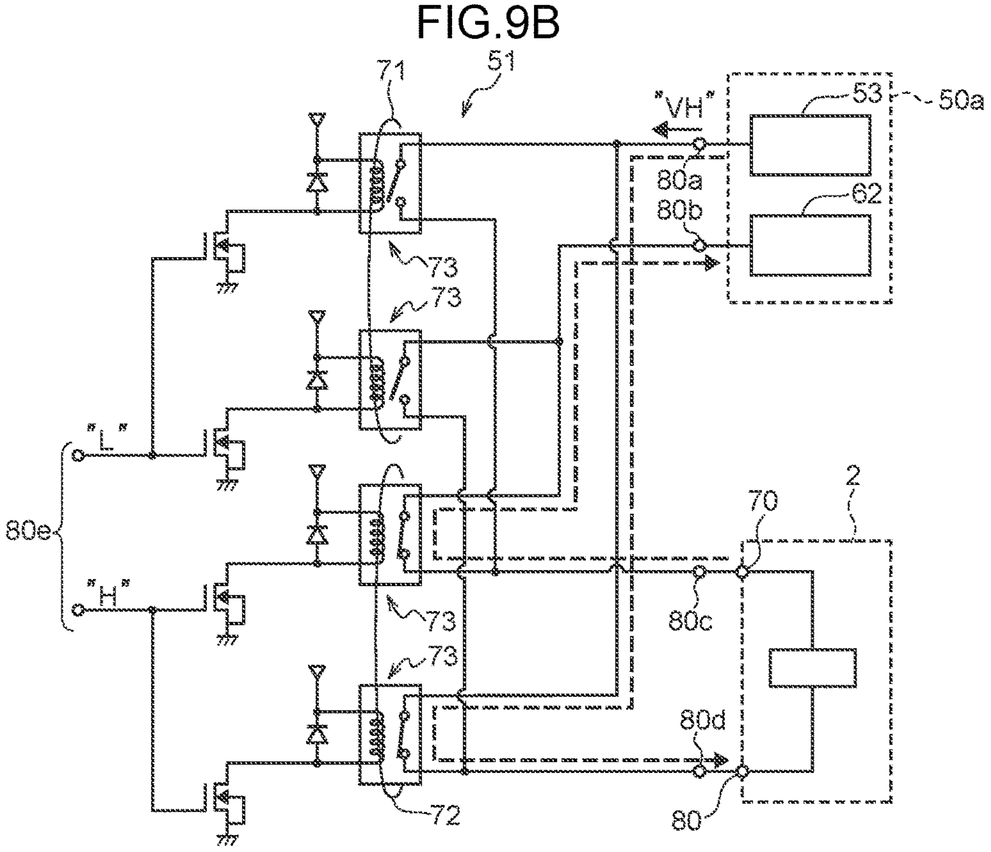
FIG. 9B is a diagram illustrating connections between a voltage generation section and a measurement tool under a respective polarity signal.

FIG. 9A and FIG. 9B are diagrams illustrating connections between the voltage generation section 50*a* and the microchip 2 under respective polarity signals. The broken arrows indicate propagation of the electrophoresis voltage. As illustrated in FIG. 9A, in a case in which the forward direction switch pair 71 become conductive, the reverse direction switch pair 72 become nonconductive. As illustrated in FIG. 9B, in a case in which the reverse direction switch pair 72 become conductive, the forward direction switch pair 71 become nonconductive.

Figure 10:
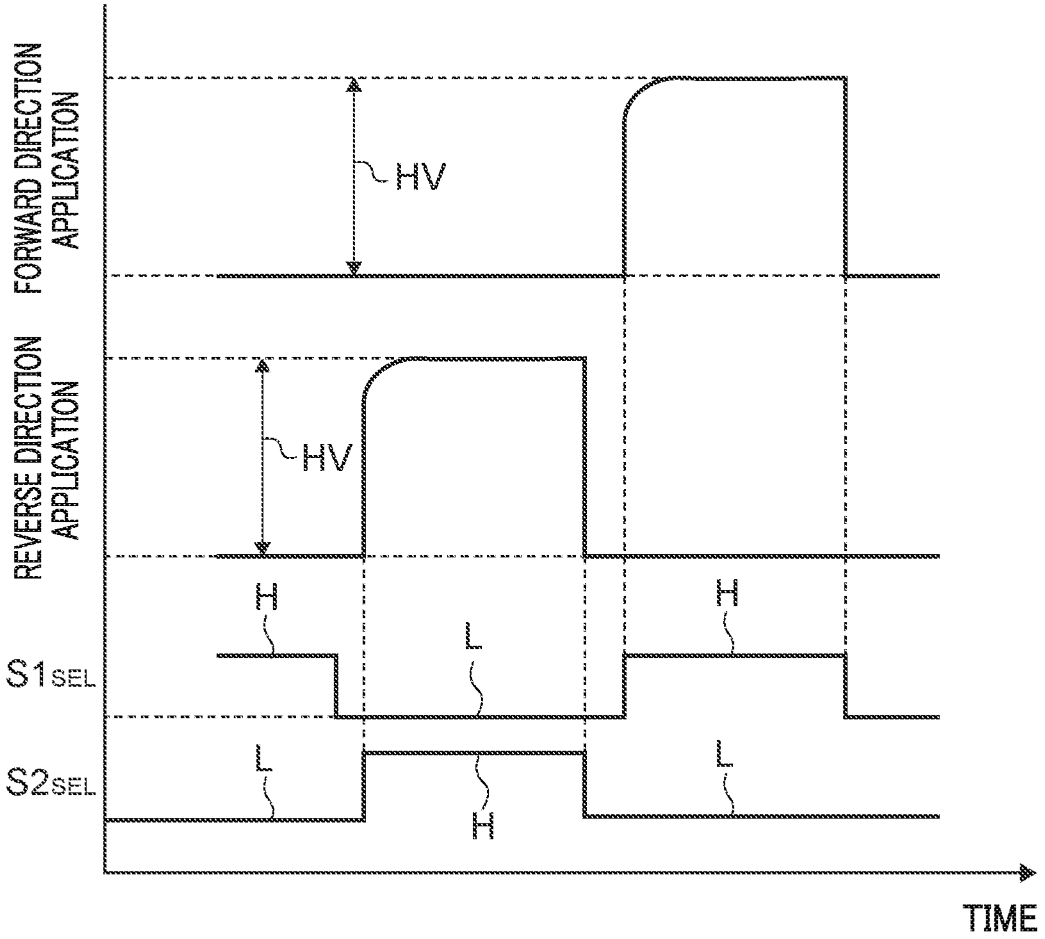
FIG. 10 illustrates waveforms of a switch selection signal $\mathbf{S1}_{SEL}$, a switch selection signal $\mathbf{S2}_{SEL}$, and electrophoresis voltages according to forward direction application and reverse direction application.

FIG. 10 illustrates waveforms of the switch selection signal $S1_{SEL}$ and the switch selection signal $S2_{SEL}$ having logical levels “H” and “L”, and waveforms of the electrophoresis voltages according to forward direction application and reverse direction application. In FIG. 10, the waveform of the electrophoresis voltage according to forward direction application is illustrated after the waveform of the electrophoresis voltage according to reverse direction application. However application of the electrophoresis voltage according to forward direction may be performed in advance of application of the electrophoresis voltage according to reverse direction. Application of the electrophoresis voltage according to reverse direction may be performed repeatedly a freely selected number of times, and application of the electrophoresis voltage according to forward direction may also be performed repeatedly a freely selected number of times.

Figure 11:
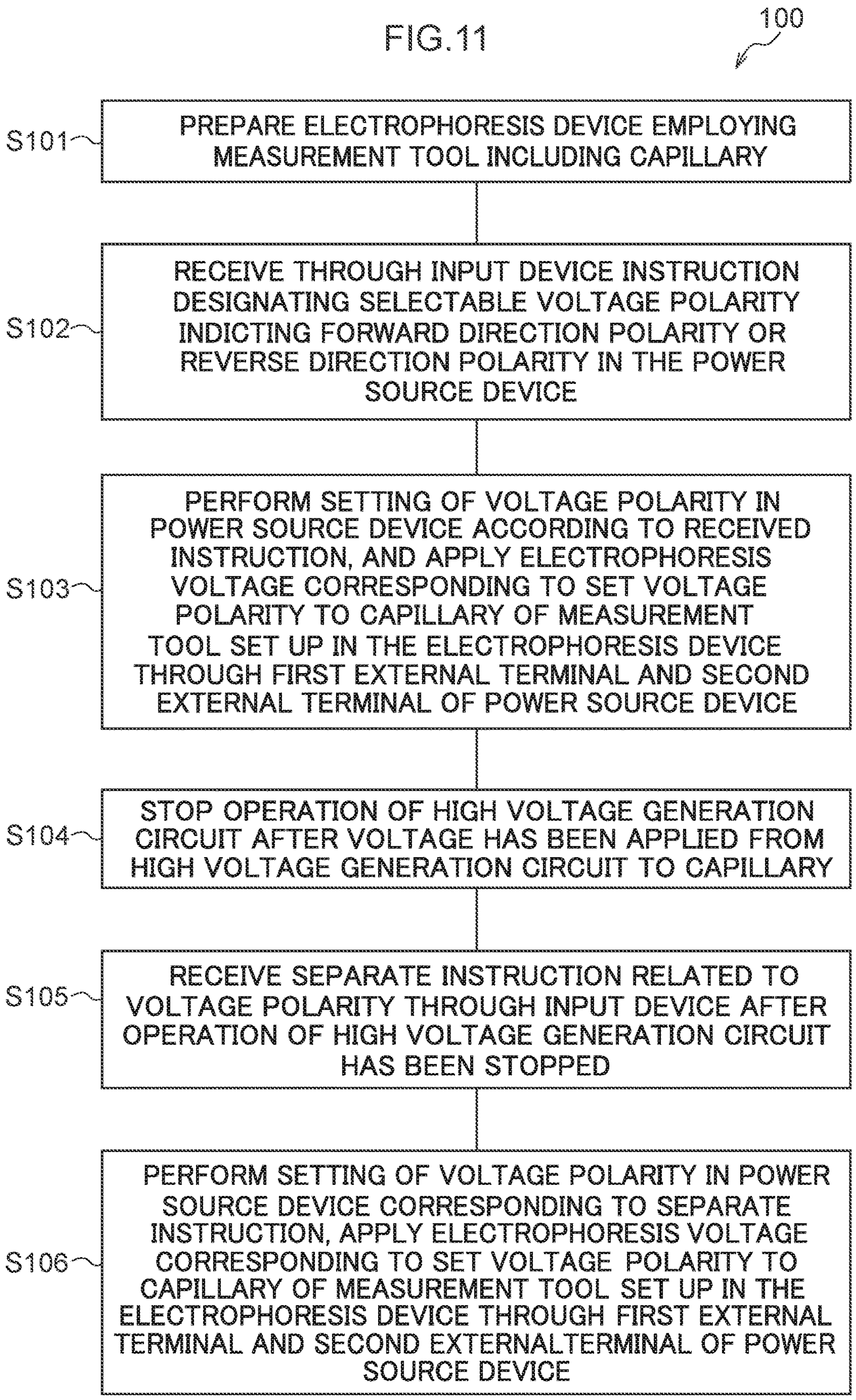
FIG. 11 is a diagram illustrating main steps of a method to control the electrophoresis device according to the present exemplary embodiment.

FIG. 11 is a flowchart illustrating main steps of a method to control the electrophoresis device according to the present exemplary embodiment. In the following description the reference numerals of the already described drawings will be employed to facilitate understanding. A method 100 for controlling the electrophoresis device 1 may include, for example, the following steps.

At step S101, the electrophoresis device 1 employing a measurement tool including a capillary 4 is prepared. The electrophoresis device 1 includes a power source device 20 and an input device 90. Preparation of the electrophoresis device 1 encompasses, for example, being assigned the electrophoresis device 1, manufacturing the electrophoresis device 1, borrowing the electrophoresis device 1, and the like.

At step S102, an instruction designating a selectable voltage polarity indicating either one of forward direction polarity or reverse direction polarity in the power source device 20 is received through the input device 90.

At step S103, the voltage polarity in the power source device 20 is set according to the received instruction. Further, at step S103, the electrophoresis voltage is applied to the measurement tool capillary 4 that has been set up in the electrophoresis device 1 by application through the first external terminal 70*a* and the second external terminal 70*b*, according to the voltage polarity set. The setting of the voltage polarity according to the received instruction may indicate the forward direction polarity or may indicate the reverse direction polarity.

According to the method 100, in the power source device 20, the electrophoresis voltage can be applied according to the selectable voltage polarity set to indicate either one of the forward direction polarity or the reverse direction polarity. Prior to operating the high voltage generation circuit 53, the output of the high voltage generation circuit 53 is connected to either one of the first external terminal 70*a* or the second external terminal 70*b*, according to the selectable voltage polarity in relation to the application voltage to the capillary 4. The capillary 4 that has been set up in the electrophoresis device 1 receives the electrophoresis voltage through the first external terminal 70*a* and the second external terminal 70*b*.

The method 100 for controlling the electrophoresis device 1 may, for example, further include the following steps.

In step S104, the operation of the high voltage generation circuit 53 is stopped after the voltage from the high voltage generation circuit 53 has been applied to the capillary 4.

In step S105, a separate instruction related to voltage polarity is received through the input device 90 after operation of the high voltage generation circuit 53 has been stopped.

At step S106, the voltage polarity in the power source device 20 is set according to the separate instruction. The electrophoresis voltage is applied to the measurement tool capillary 4 that has been set up in the electrophoresis device 1 according to the set voltage polarity by application through the first external terminal 70*a* and the second external terminal 70*b* of the power source device 20. The setting of the voltage polarity according to the received instruction may indicate the forward direction polarity or may indicate the reverse direction polarity.

According to the method 100, the operation of the high voltage generation circuit 53 can be stopped in a case in which the separate instruction related to the voltage polarity is received. This separate instruction may be the same as the previous instruction, or may be different thereto.

Figure 12:
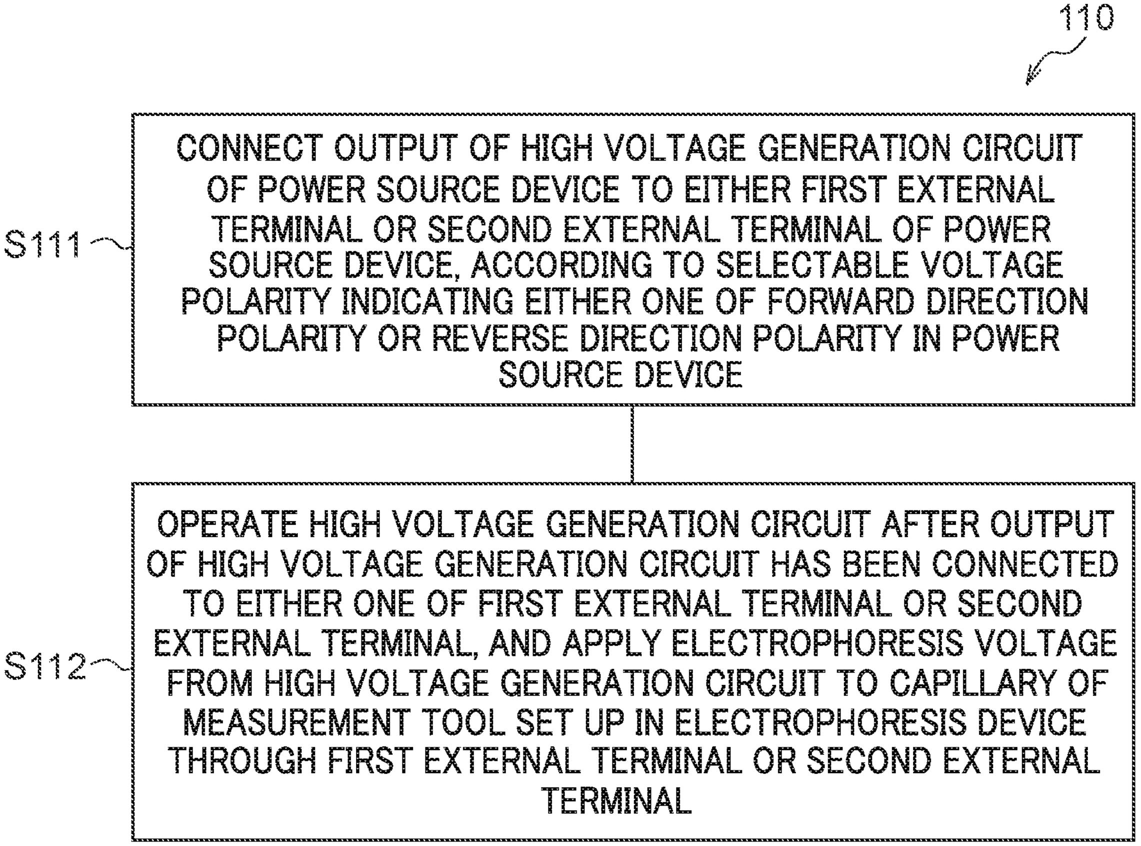
FIG. 12 is a diagram illustrating main steps of a method to control a power source device of an electrophoresis device according to the present exemplary embodiment.

FIG. 12 is a flowchart illustrating main steps of a method to control the power source device 20 of the electrophoresis device 1 according to the present exemplary embodiment. A method 110 to control the power source device 20 may, for example, include the following steps.

At step S111, the output of the high voltage generation circuit 53 of the power source device 20 is connected to either one of the first external terminal 70*a* or the second external terminal 70*b* of the power source device 20 according to the selectable voltage polarity indicating either one of the forward direction polarity or the reverse direction polarity in the power source device 20.

At step S112, the high voltage generation circuit 53 is operated after the output of the high voltage generation circuit 53 has been connected to either one of the first external terminal 70*a* or the second external terminal 70*b*. The electrophoresis voltage from the high voltage generation circuit 53 is applied to the measurement tool capillary 4 that has been set up in the electrophoresis device 1 through the first external terminal 70*a* or the second external terminal 70*b*.

In the method 110, prior to operating the high voltage generation circuit 53, the output of the high voltage generation circuit 53 is connected to either one of the first external terminal 70*a* or the second external terminal 70*b* according to the selectable voltage polarity of the application voltage to the capillary 4. The capillary 4 set up in the electrophoresis device 1 receives the electrophoresis voltage through the first external terminal 70*a* and the second external terminal 70*b*.

Detailed description follows regarding the power source device 20, with reference again to FIG. 2 and FIG. 3.

As illustrated in FIG. 2 and FIG. 3, the power source device 20 includes the input control circuit 50, the enable circuit 52, the high voltage generation circuit 53 (including the inverter transformer circuit 54 and the CCW circuit 56), the output protection circuit 58, the output voltage control circuit 60, the current detection circuit 62, and the voltage detection circuit 64. The first external terminal 70*a* and the second external terminal 70*b* are provided to the power source device 20, and the microchip 2 is connected through the first external terminal 70*a* and the second external terminal 70*b*. The power source device 20 includes the second output electrode 68, the third output electrode 74, the second input electrode 82, the third input electrode 84, the third input electrode 84, and the fourth input electrode 86, and is connected to the control device 10 through these conductors.

The power source device 20 includes a function to generate the application voltage that induces a current of a prescribed magnitude needed for measurement to flow in the microchip 2 according to an enable signal $S_{ENB}$ received from the control device 10 through the second input electrode 82. The power source device 20 includes a function to change the input voltage to the inverter transformer circuit 54 based on the magnitude of a current control signal $S_{ICNT}$ corresponding to the magnitude of an assumed voltage that is assumed to be applied to the microchip 2. Changing the input voltage is performed in an initial process of voltage application to induce electrophoresis of the sample 40 in the capillary 4.

As illustrated in FIG. 3, the enable circuit 52 includes the resistance elements R1 to R3, a transistor Tr1, and a transistor Tr2. The transistor Tr may, for example, be an npn-type bipolar transistor, and the transistor Tr2 may be a P-channel type metal-oxide-semiconductor field-effect transistor (MOSFET). The enable circuit 52 controls an input state (ON/OFF) of voltage to a primary side of the inverter transformer circuit 54 according to the enable signal $S_{ENB}$ received at the second input electrode 82.

In the enable circuit 52, a base of the transistor Tr of a common emitter circuit is connected to the second input electrode 82 through a resistance element R1, and is connected to the emitter of the transistor Tr through a resistance element R2. The collector of the transistor Tr is connected to a power source line of a drive voltage Vdd through a resistance element R3. The gate of the transistor Tr2 is connected to a common node between the collector of the transistor Tr and the resistance element R3, and as a result thereof the gate of the transistor Tr2 is connected to the source of the transistor Tr2 through the resistance element R3.

The input control circuit 50 compares a magnitude of a current monitoring signal $S_{IMON}$ input through the third input electrode 84 to the current control signal $S_{ICNT}$ input through the fourth input electrode 86. Next, the input control circuit 50 controls the magnitude of an input voltage input to the inverter transformer circuit 54 such that the magnitude of the current monitoring signal $S_{IMON}$ matches the magnitude of the current control signal $S_{ICNT}$. The current monitoring signal $S_{IMON}$ is changed in response to this control.

More specifically, the input control circuit 50 includes operational amplifiers Ap1, Ap2, resistance elements R4 to R13, capacitor elements C1, C2, and transistors Tr3, Tr4, Tr5. Each of the transistors Tr3, Tr5 may be an npn-type bipolar transistor, and the transistor Tr4 may be an N-channel type MOSFET.

The non-inverting input of the operational amplifier Ap1 is connected to the fourth input electrode 86, and receives the current control signal $S_{ICNT}$ through the fourth input electrode 86. The inverting input and the output of the operational amplifier Ap1 are connected together so as to configure a voltage follower. The output of the operational amplifier Ap1 is connected to the non-inverting input of the operational amplifier Ap2 through a resistance element R9.

The inverting input of the operational amplifier Ap2 is connected to the third input electrode 84 through a resistance element R8, and receives the current monitoring signal $S_{IMON}$ through the third input electrode 84. The output of the operational amplifier Ap2 is connected to the inverting input of the operational amplifier Ap2 through a resistance element R10 and a capacitor element C1 that are connected in parallel. Such connection enables the operational amplifier Ap2 to be configured as an inverting amplification circuit. The output of the inverting amplification circuit, and more specifically the output of the operational amplifier Ap2, is connected to a base of the transistor Tr5 through the resistance element R11. The emitter of the transistor Tr5 is connected to the low potential power source line (ground) through a capacitor element C2 and a resistance element R13 that are connected in series. Moreover, the base of the transistor Tr5 is connected to the emitter of the transistor Tr5 through a resistance element R12. The collector of the transistor Tr5 is connected to the drain of the transistor Tr2 of the enable circuit 52.

The base of the transistor Tr3 of a common emitter circuit is connected to the second input electrode 82 through the resistance element R4, and the base of the transistor Tr3 is connected to the emitter of the transistor Tr3 through the resistance element R5. The collector of the transistor Tr3 is connected to the high potential power source line Vcc through the resistance element R6, and is connected to the gate of the transistor Tr4. The drain of the transistor Tr4 is connected to the output of the operational amplifier Ap1 through the resistance element R9, and is directly connected to the non-inverting input of the operational amplifier Ap2. The non-inverting input of the operational amplifier Ap2 is connected to the low potential power source line (ground) through the resistance element R7. The base of the transistor Tr4 is connected to the low potential power source line (ground).

The input of voltage at the primary side of the inverter transformer circuit 54 is connected to the output of the input control circuit 50. The inverter transformer circuit 54 raises the input voltage of direct current (DC) input from the input control circuit 50, and also generates a raised voltage of alternating current (AC) and outputs this to the CCW circuit 56.

The CCW circuit 56 amplifies the voltage output from the inverter transformer circuit 54 and rectifies this into a direct current voltage and outputs the direct current voltage. The CCW circuit 56 includes plural capacitor elements (for example, capacitor elements C3 to C8) and plural diodes (for example, diodes D1 to D6). More specifically, the connections thereof configure a 3 stage CCW circuit that outputs a voltage of a magnitude that is six times the peak input voltage of the voltage that was input. This voltage is the actual application voltage.

As illustrated in FIG. 3, in the CCW circuit 56 the capacitor elements C3, C5, C7 are connected in series, and the capacitor elements C4, C6, C8 are also connected in series. The anode of the diode D1 is connected to a node between the capacitor element C4 and the inverter transformer circuit 54, and the cathode thereof is connected to a common node between the capacitor element C3 and the capacitor element C5. The cathode of the diode D2 is connected to a common node between the capacitor element C4 and the capacitor element C6, and the anode thereof is connected to the common node between the capacitor element C3 and the capacitor element C5. The anode of the diode D3 is connected to a common node between the capacitor element C4 and the capacitor element C6, and the cathode thereof is connected to a common node between the capacitor element C5 and the capacitor element C7. The anode of the diode D4 is connected to the common node between the capacitor element C5 and the capacitor element C7, and the cathode thereof is connected to a common node between the capacitor element C6 and the capacitor element C8. The anode of the diode D5 is connected to the common node between the capacitor element C6 and the capacitor element C8, and the cathode thereof is connected to the capacitor element C7. The anode of the diode D6 is connected to the capacitor element C7, and the cathode thereof is connected to the capacitor element C8.

As illustrated in FIG. 3, the output protection circuit 58 includes the resistance elements R20 to R23 that are connected in series. The output protection circuit 58 also functions as a low pass filter to reduce ripple from the CCW circuit 56. The output protection circuit 58 accordingly includes the resistance elements R20 to R23 and a capacitor element C12 connected together so as to configure an RC low pass filter. Moreover, the output protection circuit 58 is able to greatly lower the voltage of the output of the output protection circuit 58 compared to the high voltage hitherto, in a case in which a connection is made between the first internal conductor 80*a* and the second internal conductor 80*b* without passing through the microchip 2.

The voltage output from the output protection circuit 58 is applied to the microchip 2. The output voltage control circuit 60 monitors the output voltage of the CCW circuit 56, and in a case in which the magnitude of this output voltage is a prescribed magnitude or greater, suppresses the output voltage from becoming an excessive voltage by interrupting current input to the primary side of the inverter transformer circuit 54.

The output voltage control circuit 60 includes the operational amplifier Ap3, the resistance elements R14 to R17, the capacitor element C9, and the transistors Tr6, Tr7. The transistor Tr6 may be an npn-type bipolar transistor, and the transistor Tr7 may be an N-channel type MOSFET.

The inverting input of the operational amplifier Ap3 is connected to a reverse direction diode DI1 and to a voltage divider circuit between the CCW circuit 56 and the low potential power source line (ground). More specifically The inverting input of the operational amplifier Ap3 is connected to a voltage divider circuit that provides a divided voltage divided by resistance elements R18, R19 that are connected in series (divided voltage of the output voltage of the CCW circuit 56). In the present exemplary embodiment, due to making the resistance value of the resistance element R18 high and the resistance value of the resistance element R19 low (at least lower than that of the resistance element R18), the voltage value of the voltage input to the non-inverting input of the operational amplifier Ap3 is made lower. As a specific example, a resistance value of the resistance element R18 may be 100 MΩ, and the resistance value of the resistance element R19 may be 100 kΩ.

The non-inverting input of the operational amplifier Ap3 is connected to a reference voltage source. The reference voltage source includes a voltage divider circuit that provides a voltage from dividing the high potential power source line Vcc, and a capacitor element C9 connected to the output of the voltage divider circuit. The voltage divider circuit, for example, includes resistance elements R14 and R15 that are connected in series. The magnitude of the voltage resulting from dividing the voltage of the high potential power source line Vcc may be matched to an output voltage of the voltage divider circuit connected between the CCW circuit 56 and the low potential power source line (ground).

The output of the operational amplifier Ap3 is connected to the collector of the transistor Tr6 and the gate of the transistor Tr7 of a common emitter circuit through the resistance element R16. The source of the transistor Tr7 is connected to the low potential power source line (ground) through the resistance element R17. The base of the transistor Tr6 is connected to the source of the transistor Tr7. Such connection means that the transistor Tr6 and the resistance element R17 function as a current control circuit to control current input to the primary side of the inverter transformer circuit 54. The drain of the transistor Tr7 is connected to the low potential side line of the primary side of the inverter transformer circuit 54.

The current detection circuit 62 receives current that flowed in the microchip 2 through the second internal conductor 80*b* in a case in which the application voltage has been applied through the first external terminal 70*a*. The current detection circuit 62 monitors the current flow and provides the current monitoring signal $S_{IMON}$ corresponding to the magnitude of this current to the second output electrode 68. The current monitoring signal $S_{IMON}$ is input from the second output electrode 68 to the input control circuit 50 through the control device 10 and the third input electrode 84. In the current detection circuit 62 the current monitoring signal $S_{IMON}$ is a signal corresponding to the magnitude of the actual application voltage.

More specifically, the current detection circuit 62 includes the operational amplifier Ap4, resistance elements R24 to R26, and a capacitor element C13. The non-inverting input of the operational amplifier Ap4 is connected to the second external terminal 70*b*, and is connected to the low potential power source line (ground) through the resistance element R24. The magnitude of the input voltage to the non-inverting input of the operational amplifier Ap4 is determined by the magnitude of the current flow in the microchip 2 and the resistance value of the resistance element R24. The resistance value of the resistance element R24 is, for example, determined according to the magnitude of an assumed load on the microchip 2.

The output of the operational amplifier Ap4 is connected to the inverting input thereof through a resistance element R26 and a capacitor element C13 that are connected in parallel. The inverting input of the operational amplifier Ap4 is grounded through the resistance element R25. Such connection causes the operational amplifier Ap4 to operate as an inverting amplification circuit. The output of the operational amplifier Ap4 is connected to the second output electrode 68, and provides the current monitoring signal $S_{IMON}$.

The voltage detection circuit 64 monitors the application voltage output from the output protection circuit 58, and generates the voltage monitoring signal $S_{VMON}$ corresponding to the magnitude of the output voltage of the output protection circuit 58. Then, the voltage monitoring signal $S_{VMON}$ is provided to the third output electrode 74. The voltage monitoring signal $S_{VMON}$ is output from the third output electrode 74 and input to the control device 10. In the voltage detection circuit 64, the voltage monitoring signal $S_{VMON}$ is a signal corresponding to the magnitude of the actual application voltage.

The voltage detection circuit 64 includes an operational amplifier Ap5, resistance elements R27 to R30, and a capacitor element C14. The non-inverting input of the operational amplifier Ap5 is connected to a voltage divider circuit (the resistance element R27 and resistance element R28 connected in series) and to a reverse direction diode D12. The voltage divider circuit is connected between the low potential power source line (ground) and the output of the output protection circuit 58 (the first internal conductor 80*a*). The non-inverting input of the operational amplifier Ap5 receives a voltage resulting from dividing the voltage output from the CCW circuit 56 using the resistance elements R20 to R27 and R28. The output of the operational amplifier Ap5 is connected to the inverting input of the operational amplifier Ap5 through a resistance element R30 and a capacitor element C14 that are connected in parallel. The inverting input of the operational amplifier Ap5 is connected to the low potential power source line (ground) through the resistance element R29. Such connection means that the operational amplifier Ap5 operates as an inverting amplification circuit. The output of the operational amplifier Ap5 is connected to the third output electrode 74 and provides the voltage monitoring signal $S_{VMON}$ to the third output electrode 74.

The output voltage control circuit 60 and the voltage detection circuit 64 both include a function to monitor the voltage output from the CCW circuit 56, and the voltage detection circuit 64 is connected to the CCW circuit 56 through the output protection circuit 58. This approach is adopted because the magnitudes of the voltages respectively applied to the output voltage control circuit 60 and the voltage detection circuit 64 are different from each other, and the circuit configurations of the output voltage control circuit 60 and the voltage detection circuit 64 are also different from each other.

Description follows regarding operation of the power source device 20. The electrophoresis device 1 performs control in the following manner at an initial stage of voltage application to electrophorese the sample 40 in the capillary 4. In a case in which measurement of the microchip 2 (the sample 40) is performed, the control device 10 outputs the enable signal $S_{ENB}$ to operate the power source device 20. The storage device 403 of the control device 10 stores data of the voltages arising in cases assuming a current of a prescribed magnitude flows in the microchip 2 (hereafter referred to as "assumed voltage"), and the control device 10 outputs the current control signal $S_{ICNT}$ corresponding to the assumed voltage.

In a case in which the enable signal $S_{ENB}$ is input from the control device 10 to the enable circuit 52, the power source device 20 operates to generate the electrophoresis voltage. More specifically, the transistor Tr of the enable circuit 52 adopts an ON state in response to the enable signal $S_{ENB}$. In response to this ON state, the transistor Tr2 of the enable circuit 52 also adopts an ON state, and the drive voltage Vdd is supplied to the input control circuit 50.

On receiving the drive voltage Vdd, the input control circuit 50 provides the input voltage to the inverter transformer circuit 54. More specifically, the transistor Tr3 adopts an ON state in response to the enable signal $S_{ENB}$ from the second input electrode 82, the transistor Tr3 becomes conductive, and the transistor Tr4 adopts an OFF state. The operational amplifier Ap1 receives the current control signal $S_{ICNT}$ through the fourth input electrode 86. The operational amplifier Ap2 receives the current control signal $S_{ICNT}$ from the operational amplifier Ap1 at its non-inverting input, and receives the current monitoring signal $S_{IMON}$ through the third input electrode 84 at its inverting input. In response thereto, the operational amplifier Ap2 generates a voltage signal corresponding to the magnitude of the current control signal $S_{ICNT}$ and the magnitude of the current monitoring signal $S_{IMON}$. This voltage signal is provided to the base of the transistor Tr5. In response to this signal, the transistor Tr5 adopts an ON state, and an input voltage to the inverter transformer circuit 54 is provided through the transistor Tr5.

A control loop is started. The inverter transformer circuit 54 receives an input voltage through the transistor Tr5. The inverter transformer circuit 54 outputs an alternating current voltage resulting from raising the input voltage.

The CCW circuit 56 voltage-amplifies the raised voltage output from the inverter transformer circuit 54 (for example by six times) and then outputs the amplified voltage. In a case in which the magnitude of the output voltage output from the CCW circuit 56 has reached a value that is a prescribed magnitude corresponding to the magnitude of the application voltage or greater, then current being input to the primary side of the inverter transformer circuit 54 is interrupted.

The output voltage from the CCW circuit 56 is output as the application voltage from the first external terminal 70*a* through the output protection circuit 58.

The output voltage from the CCW circuit 56 is provided to the voltage divider circuit including the resistance elements R27 and R28 that are connected in series through the output protection circuit 58, and the voltage divider circuit provides the voltage divided value to the voltage detection circuit 64. The voltage detection circuit 64 generates the voltage monitoring signal $S_{VMON}$ according to the voltage (voltage divided value) output from the output protection circuit 58. Then, the voltage monitoring signal $S_{VMON}$ is provided to the control device 10 through the third output electrode 74.

However, the microchip 2 receives the application voltage at its two ends, from the first electrode 22 connected to the first external terminal 70*a* and from the second electrode 24 connected to the second external terminal 70*b*, and is accordingly able to measure the sample 40. During measurement a current flows in the microchip 2 (the sample 40) according to the actual application voltage.

This current is input to the current detection circuit 62, the current detection circuit 62 generates the current monitoring signal $S_{IMON}$ corresponding to the magnitude of this current flow in the microchip 2, and the current monitoring signal $S_{IMON}$ is provided to the control device 10 through the second output electrode 68. The current monitoring signal $S_{IMON}$ is provided to the input control circuit 50 through the control device 10 and the third input electrode 84.

In the input control circuit 50, the operational amplifier Ap2 compares the magnitude of the current monitoring signal $S_{IMON}$ against the magnitude of the current control signal $S_{ICNT}$, and generates a signal to change the input voltage of the inverter transformer circuit 54 based on this comparison result. More specifically, the operational amplifier Ap2 provides a signal to the base of the transistor Tr5 that is a signal having a magnitude corresponding to a difference between the magnitude of the current monitoring signal $S_{IMON}$ and the magnitude of the current control signal $S_{ICNT}$. In response thereto, the magnitude of the base-emitter voltage $V_{BE}$ is changed in the transistor Tr5. In response to this change, the output from the input control circuit 50 to the inverter transformer circuit 54 changes. Thus, in a case in which there is a substantial difference between the magnitude of the current monitoring signal $S_{IMON}$ and the magnitude of the current control signal $S_{ICNT}$, the magnitude of the input voltage input to the inverter transformer circuit 54 is updated according to this difference. In a case in which there is no longer a substantial difference between the magnitude of the current monitoring signal $S_{IMON}$ and the magnitude of the current control signal $S_{ICNT}$, the magnitude of the input voltage input to the inverter transformer circuit 54 is maintained.

This completes the description of a cycle of updating. Processing then returns to a "control loop is started", and the update operation is repeated.

In a case in which this processing is performed repeatedly, the assumed voltage stored in the storage device 403 is updated for each loop, and the current control signal corresponding to this updated assumed voltage is output in the next loop. By repeatedly performing the operations in the loop in this manner, a current of the prescribed magnitude corresponding to the assumed voltage flows in the microchip 2, and setting of the current is completed. The voltage corresponding to the current of this prescribed magnitude is thereafter applied to the microchip 2. The sample 40 being electrophoresed in the capillary 4 enables, for example, a specific component such as hemoglobin A1c or the like in the blood to be analyzed. During this electrophoresis, each of the operations in the loop as described above may be performed repeatedly.

In a case in which a disposable type of the microchip 2 is employed as the measurement tool, the load is not fixed, and in a case in which a conventional power source device is employed, there may be cases in which the magnitude of the assumed voltage does not match the magnitude of the actual application voltage based on the actual current flow in the microchip 2. Namely, in a case in which the measurement tool is the disposable type microchip 2, sometimes the prescribed magnitude of current does not flow in the microchip 2. However to address such situations, the power source device 20 enables a current of the prescribed magnitude to flow irrespective of the microchip 2 as described above, while also enabling a high voltage to be provided by forward polarity application and reverse polarity application.

Moreover, in the power source device 20 the raised voltage output from the inverter transformer circuit 54 is amplified by the CCW circuit 56, and so there is no need for a large current, and forward polarity application and reverse polarity application of the high voltage can be provided with a comparatively small current.

The power source device 20 enables a high accuracy to be maintained for the accuracy in the magnitude of the voltage for application with a small current, while also enabling forward polarity application and reverse polarity application of the high voltage. Moreover, the power source device 20 employs the inverter transformer circuit 54 and the CCW circuit 56 as described above, enabling forward polarity application and reverse polarity application of the high voltage while suppressing the power source device 20 from becoming bulky and also suppressing the cost thereof.

Moreover, for example, the power source device 20 may be applied to a measurement device and an analysis device other than the electrophoresis device 1. Note that the power source device 20 enables forward polarity application and reverse polarity application of the high voltage irrespective of variation in load of the measurement tool.

Moreover, the current detection circuit 62 enables control of the magnitude of current to be performed with higher accuracy by adjustment based on the magnitude of the assumed voltage and magnitude of the current corresponding to the assumed voltage.

The present disclosure is not limited to the exemplary embodiment described above, and various modifications may be implemented within a range not departing from the spirit of the present disclosure. All of such modifications are encompassed in the technical concept of the present disclosure.

As described above, the present exemplary embodiment provides a power source device having a polarity of electrophoresis voltage selectable in both one direction and a reverse direction, and provides an electrophoresis device including such a power source device and a method to control such an electrophoresis device.

All publications, patent applications and technical standards mentioned in the present specification are incorporated by reference in the present specification to the same extent as if each individual publication, patent application, or technical standard was specifically and individually indicated to be incorporated by reference.

What is claimed is:

1. A power source device configured for an electrophoresis device employing a measurement tool including a capillary, the power source device comprising:

a high voltage generation circuit configured to generate a voltage for electrophoresis;

a first external terminal and a second external terminal configured to apply the electrophoresis voltage to the capillary;

a polarity switching circuit including a first internal conductor connected to the high voltage generation circuit and a second internal conductor, the polarity switching circuit being configured to selectably apply a potential difference between the second internal conductor and the first internal conductor across the first external terminal and the second external terminal by application with either a forward direction polarity or a reverse direction polarity; and a switching control circuit configured to control polarity switching of the polarity switching circuit to select either one of application with the forward direction polarity or application with the reverse direction polarity, wherein the polarity switching circuit includes a forward direction switch pair of a first forward direction switch and a second forward direction switch, and a reverse direction switch pair of a first reverse direction switch and a second reverse direction switch;

the first forward direction switch is connected between the first internal conductor and the first external terminal;

the second forward direction switch is connected between the second internal conductor and the second external terminal;

the first reverse direction switch is connected between the first internal conductor and the second external terminal;

the second reverse direction switch is connected between the second internal conductor and the first external terminal:

the switching control circuit is configured to control the polarity switching circuit so as to make either one of the forward direction switch or the reverse direction switch exclusively conductive;

each of the first forward direction switch, the second forward direction switch, the first reverse direction switch, and the second reverse direction switch, includes an input side that receives a switching signal according to the forward direction polarity or the reverse direction polarity and an output side that operates in response to the switching signal; and the output side is electrically insulated from the input side.

2. The power source device of claim 1, wherein the switching control circuit includes an interval generation circuit configured to generate a signal for switching between the forward direction switch pair and the reverse direction switch pair, so as to provide an interval of time during which both the forward direction switch pair and the reverse direction switch pair are nonconductive, in a case in which switching between one and the other of the forward direction switch pair and the reverse direction switch pair.

3. The power source device of claim 1, wherein:

the switching control circuit includes an input that receives a polarity signal that defines the forward direction polarity or the reverse direction polarity; and the switching control circuit includes a hold circuit configured to hold a polarity state as indicated by the polarity signal.

4. The power source device of claim 3, wherein the polarity signal is generated based on an operation mode designation input through an input device of the electrophoresis device.

5. The power source device of claim 3, wherein:

the power source device further comprises a voltage detection circuit connected to an output of the high voltage generation circuit, the voltage detection circuit being configured to generate a detection signal indicating voltage generation or non-generation in the high voltage generation circuit;

the switching control circuit includes an inhibit circuit that receives the detection signal and the polarity signal;

the hold circuit is connected to an output of the inhibit circuit; and the inhibit circuit generates an output value that holds the polarity state of the hold circuit irrespective of the polarity signal, in a case in which the detection signal indicates that the high voltage generation circuit is performing voltage generation operation, and generates an output value corresponding to a value of the polarity signal, in a case in which the detection signal indicates that the high voltage generation circuit is not performing voltage generation operation.

6. The power source device of claim 1, wherein:

the high voltage generation circuit includes a generation circuit configured to generate a voltage, and an amplification circuit configured to amplify the voltage generated by the generation circuit and output the electrophoresis voltage; and the amplification circuit includes a Cockcroft-Walton circuit.

7. The power source device of claim 1, wherein:

the polarity switching circuit further includes a current detection circuit to receive a current from the capillary through the polarity switching circuit; and the current detection circuit is connected to the second internal conductor.

8. An electrophoresis device that employs a measurement tool including a capillary, the electrophoresis device comprising:

a power source device configured to generate an electrophoresis voltage, wherein the power source device includes a high voltage generation circuit configured to generate a voltage for electrophoresis;

a first external terminal and a second external terminal configured to apply the electrophoresis voltage to the capillary, a polarity switching circuit including a first internal conductor connected to the high voltage generation circuit and a second internal conductor, the polarity switching circuit being configured to selectably apply the electrophoresis voltage across the first external terminal and the second external terminal by application with either a forward direction polarity or a reverse direction polarity; and a switching control circuit configured to control polarity switching of the polarity switching circuit to select either one of application with the forward direction polarity or application with the reverse direction polarity;

an input device configured to receive designation of an operation mode indicting either the forward direction polarity or the reverse direction polarity, wherein the polarity switching circuit includes a forward direction switch pair of a first forward direction switch and a second forward direction switch, and a reverse direction switch pair of a first reverse direction switch and a second reverse direction switch;

the first forward direction switch is connected between the first internal conductor and the first external terminal;

the second forward direction switch is connected between the second internal conductor and the second external terminal;

the first reverse direction switch is connected between the first internal conductor and the second external terminal;

the second reverse direction switch is connected between the second internal conductor and the first external terminal;

the switching control circuit is configured to control the polarity switching circuit so as to make either one of the forward direction switch or the reverse direction switch exclusively conductive;

each of the first forward direction switch, the second forward direction switch, the first reverse direction switch, and the second reverse direction switch, includes an input side that receives a switching signal according to the forward direction polarity or the reverse direction polarity and an output side that operates in response to the switching signal; and the output side is electrically insulated from the input side.

9. A method of controlling a power source device of an electrophoresis device employing a measurement tool including a capillary, the power source device comprising:

a high voltage generation circuit configured to generate a voltage for electrophoresis;

a first external terminal and a second external terminal configured to apply the electrophoresis voltage to the capillary;

a polarity switching circuit including a first internal conductor connected to the high voltage generation circuit and a second internal conductor, the polarity switching circuit being configured to selectably apply a potential difference between the second internal conductor and the first internal conductor across the first external terminal and the second external terminal by application with either a forward direction polarity or a reverse direction polarity; and a switching control circuit configured to control polarity switching of the polarity switching circuit to select either one of application with the forward direction polarity or application with the reverse direction polarity, the polarity switching circuit includes a forward direction switch pair of a first forward direction switch and a second forward direction switch, and a reverse direction switch pair of a first reverse direction switch and a second reverse direction switch;

the first forward direction switch is connected between the first internal conductor and the first external terminal;

the second forward direction switch is connected between the second internal conductor and the second external terminal;

the first reverse direction switch is connected between the first internal conductor and the second external terminal;

the second reverse direction switch is connected between the second internal conductor and the first external terminal;

the switching control circuit is configured to control the polarity switching circuit so as to make either one of the forward direction switch or the reverse direction switch exclusively conductive;

each of the first forward direction switch, the second forward direction switch, the first reverse direction switch, and the second reverse direction switch, includes an input side that receives a switching signal according to the forward direction polarity or the reverse direction polarity and an output side that operates in response to the switching signal; and the output side is electrically insulated from the input side, the method comprising:

connecting an output of the high voltage generation circuit of the power source device to either one of the first external terminal or the second external terminal of the power source device according to a selectable voltage polarity indicating either one of the forward direction polarity or the reverse direction polarity in the power source device; and operating the high voltage generation circuit after the output of the high voltage generation circuit has been connected to either one of the first external terminal or the second external terminal, and applying the electrophoresis voltage from the high voltage generation circuit to the capillary of the measurement tool set up in the electrophoresis device through the first external terminal or through the second external terminal.

* * * * *